(12) United States Patent
Paparo et al.

(10) Patent No.: US 8,796,990 B2
(45) Date of Patent: Aug. 5, 2014

(54) SYSTEM AND METHOD FOR INDUCTIVELY TRANSFERRING AC POWER AND SELF ALIGNMENT BETWEEN A VEHICLE AND A RECHARGING STATION

(71) Applicants: Vincenzo I. Paparo, Daleville, VA (US); Robert Atkins, Wytheville, VA (US)

(72) Inventors: Vincenzo I. Paparo, Daleville, VA (US); Robert Atkins, Wytheville, VA (US)

(73) Assignee: Evatran Group, Inc., Wytheville, VA (US)

( * ) Notice: Subject to any disclaimer, the term of this patent is extended or adjusted under 35 U.S.C. 154(b) by 0 days.

(21) Appl. No.: 13/892,660

(22) Filed: May 13, 2013

(65) Prior Publication Data

US 2013/0249480 A1 Sep. 26, 2013

Related U.S. Application Data

(62) Division of application No. 13/033,923, filed on Feb. 24, 2011.

(60) Provisional application No. 61/308,099, filed on Feb. 25, 2010.

(51) Int. Cl.
- *H02J 7/00* (2006.01)
- *H01F 17/04* (2006.01)
- *H01F 27/42* (2006.01)

(52) U.S. Cl.
USPC ........... 320/108; 336/172; 336/178; 320/109; 307/104

(58) Field of Classification Search
USPC ............ 320/108, 109; 307/104; 336/178, 172
See application file for complete search history.

(56) References Cited

U.S. PATENT DOCUMENTS

| | | | |
|---|---|---|---|
| 5,204,653 A * | 4/1993 | Saitoh et al. | 336/178 |
| 5,416,664 A | 5/1995 | Becker et al. | |
| 5,545,966 A * | 8/1996 | Ramos et al. | 320/108 |
| 5,661,391 A | 8/1997 | Ito et al. | |
| 5,982,139 A | 11/1999 | Parise | |
| 6,049,191 A * | 4/2000 | Terazoe et al. | 320/108 |
| 6,397,990 B1 * | 6/2002 | Brien et al. | 191/10 |
| 6,848,547 B1 | 2/2005 | Odachi et al. | |
| 7,323,964 B1 | 1/2008 | Shyu et al. | |
| 2005/0104706 A1 | 5/2005 | Chou | |
| 2007/0252441 A1 | 11/2007 | Yamauchi et al. | |
| 2010/0201204 A1 * | 8/2010 | Sakoda et al. | 307/104 |
| 2010/0225271 A1 * | 9/2010 | Oyobe et al. | 320/108 |
| 2010/0271157 A1 * | 10/2010 | Talon | 335/229 |
| 2010/0295506 A1 * | 11/2010 | Ichikawa | 320/108 |
| 2012/0153893 A1 | 6/2012 | Schatz et al. | |

FOREIGN PATENT DOCUMENTS

JP 06245326 A 9/1994

* cited by examiner

*Primary Examiner* — M'Baye Diao
(74) *Attorney, Agent, or Firm* — Leading Edge Law Group, PLC

(57) ABSTRACT

A method and apparatus for hands free inductive charging of batteries for an electric vehicle is characterized by the use of a transformer having a primary coil connected with a charging station and a secondary coil connected with a vehicle. More particularly, the when the vehicle is parked adjacent to the charging station, the primary coil is displaced via a self alignment mechanism to position the primary coil adjacent to the secondary coil to maximize the inductive transfer of charging current to the secondary coil. The self alignment mechanism preferably utilizes feedback signals from the secondary coil to automatically displace the primary coil in three directions to position the primary coil for maximum efficiency of the transformer.

18 Claims, 21 Drawing Sheets

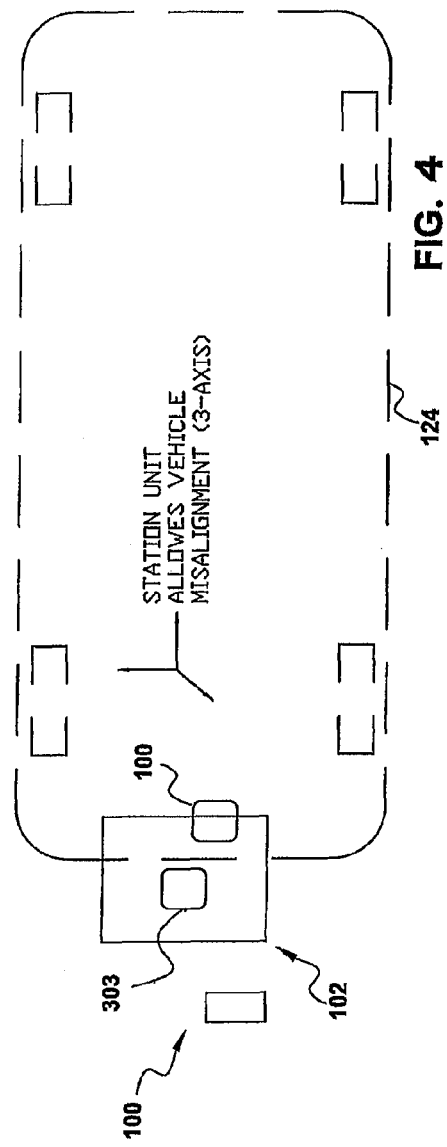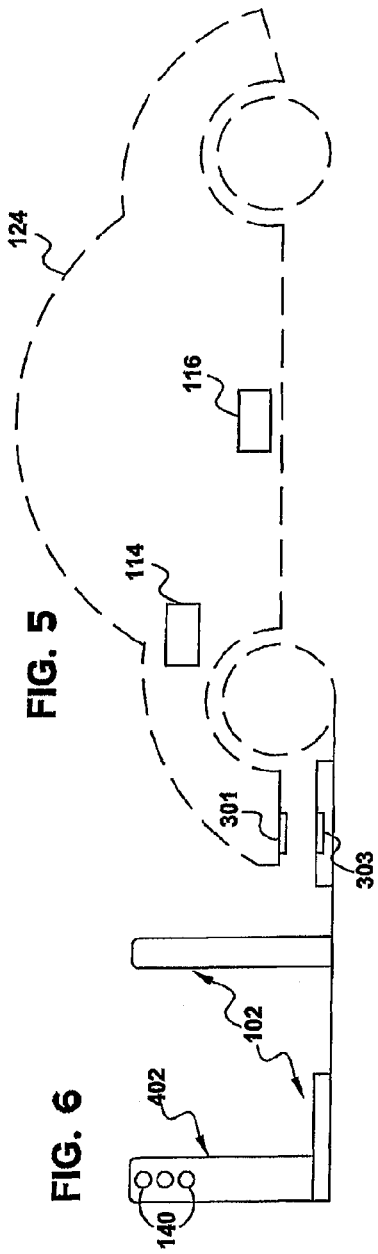

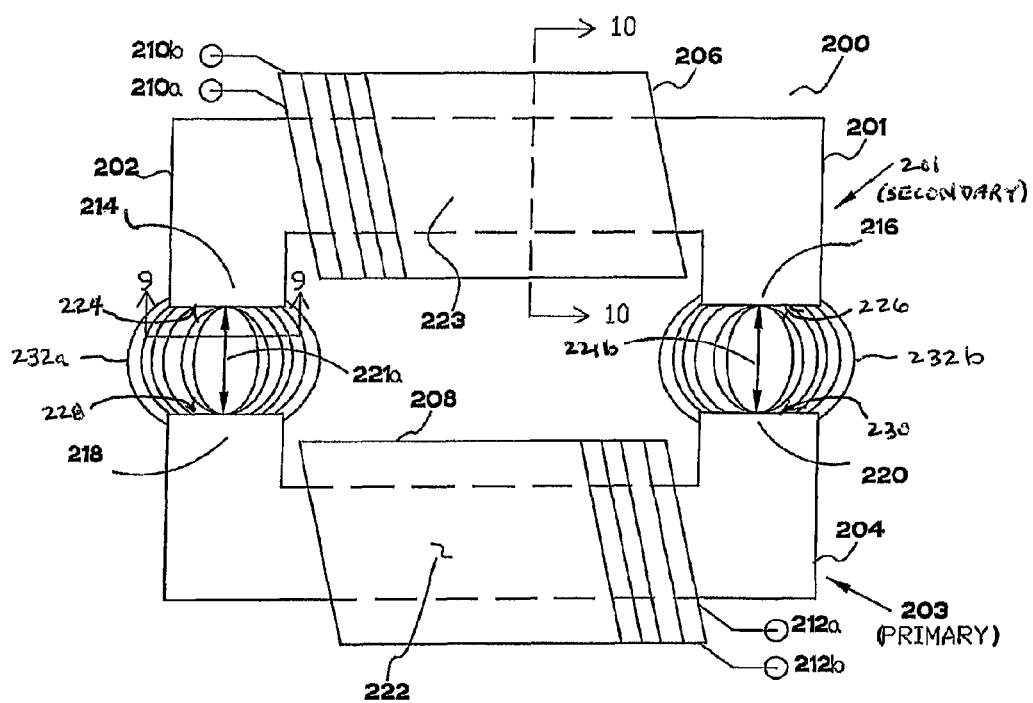
FIG. 8
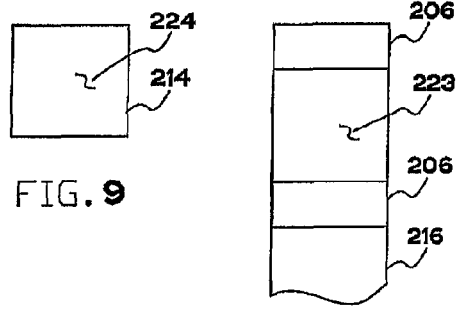
FIG. 9
FIG. 10

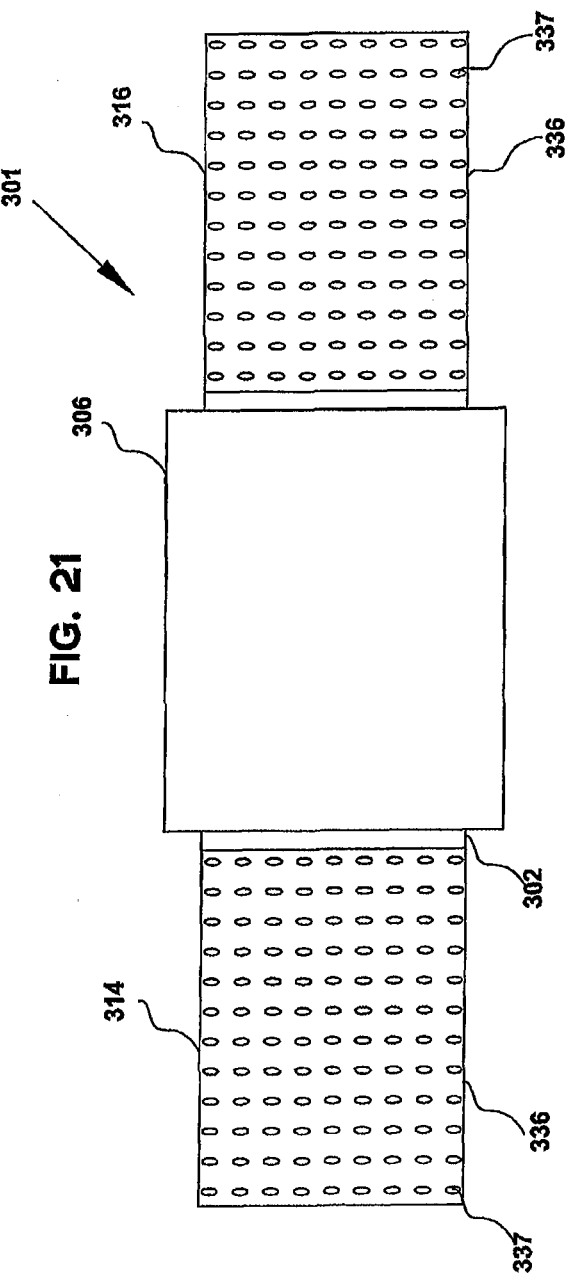

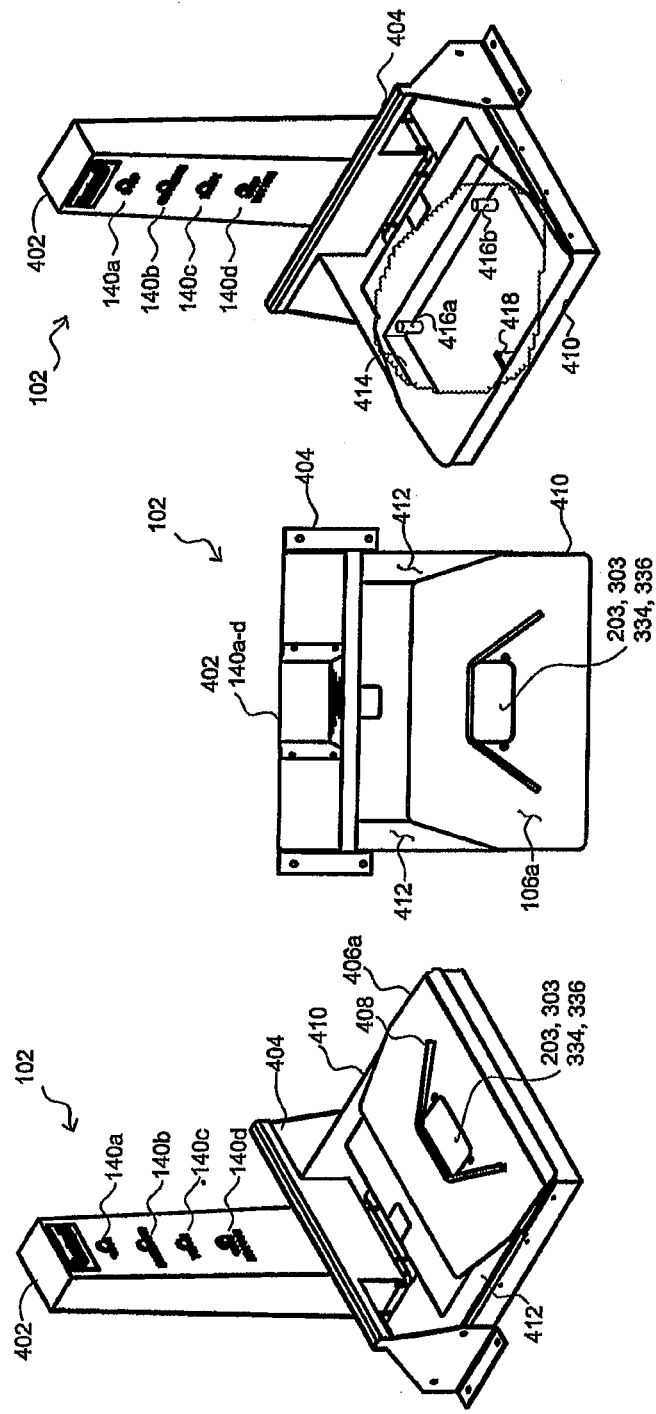

SYSTEM AND METHOD FOR INDUCTIVELY TRANSFERRING AC POWER AND SELF ALIGNMENT BETWEEN A VEHICLE AND A RECHARGING STATION

This application is a division of application Ser. No. 13/033,923 filed Feb. 24, 2011 which claims the benefit of U.S. provisional patent application No. 61/308,099 filed Feb. 25, 2010.

BACKGROUND OF THE INVENTION

It is now well established that our nation, and many other nations, face serious environmental and fuel supply problems with internal combustion engines. Most internal combustion engines run on either gasoline or diesel fuels, both of which are petroleum products. As is well known, the world's oil supply is generally found far beneath the planet's surface, and in only a few specific locations. Enormous amounts of infrastructure and significant costs are involved in finding, extracting, and processing the oil into gasoline and diesel fuels, and further significant costs are incurred in the storage, transportation, and sale of the finished gasoline and diesel fuel products.

It is well established that there is only a finite supply of petroleum in our world, and further that the byproducts of combustion, among them carbon monoxide (CO), can and have caused environmental damage to our planet, and have created health risks to humans as well. Thus our nation, as well as many others, faces the problems of a strong reliance on petroleum products for transportation, heating and manufacturing, and that those petroleum products are in short supply and damaging our world and ourselves.

As a result, there is increased attention on lessening both the reliance on petroleum products and on the negative effects of burning petroleum products. A partial solution is the use of electric vehicles. Electric vehicles, whether purely electric or in the form of gasoline-electric hybrid vehicles, will reduce pollution and the use of petroleum products, especially in the form of gasoline since most electricity-producing power plants run on either natural gas, oil, nuclear power, or coal. While each of these alternative fuel sources produces its own set of issues in regard to the environmental and supply debate, it is generally believed that if a nation, in particular the United States of America, could replace significant amounts of its internal combustion automobile engines with electric vehicles, local, national and perhaps global pollution levels would decrease.

There have been, therefore, significant expenditures of time, effort, and financial resources to launch the use of at least gasoline-electric hybrid (herein after "hybrid") vehicles, as well as vehicles that run exclusively on electricity (herein after, both types of automobiles shall be referred to simply as "electric vehicles"), by private automobile manufacturers, and government leaders. Of the many obstacles that have presented themselves to those in the industry of manufacturing electric vehicles, one significant problem is that of recharging the batteries, cells, or other electrical energy storage devices.

Vehicle energy storage systems are normally recharged using direct contact conductors between an alternating current (AC) source such as is found in most homes in the form or electrical outlets; nominally 120 or 240 VAC. A well known example of a direct contact conductor is a two or three pronged plug normally found with any electrical device. Manually plugging a two or three pronged plug from a charging device to the electric automobile requires that conductors carrying potentially lethal voltages be handled. In addition, the conductors may be exposed, tampered with, or damaged, or otherwise present hazards to the operator or other naïve subjects in the vicinity of the charging vehicle. Although most household current is about 120 VAC single phase, in order to recharge electric vehicle batteries in a reasonable amount of time (two-four hours), it is anticipated that a connection to a 240 VAC source would be required because of the size and capacity of such batteries. Household current from a 240 VAC source is used in most electric clothes dryers and clothes washing machines. The owner/user of the electric vehicle would then be required to manually interact with the higher voltage three pronged plug and connect it at the beginning of the charging cycle, and disconnect it at the end of the charging cycle. The connection and disconnection of three pronged plugs carrying 240 VAC presents an inconvenient and potentially hazardous method of vehicle interface, particularly in inclement weather.

In order to alleviate the problem of using two or three pronged conductors, exemplary embodiments of the present invention utilize an inductive charging system to transfer power to the electric vehicle. Inductive charging, as is known to those of skill in the art, utilizes a transformer to charge the battery of the target device. One example of known inductive charging systems is that used to charge electric toothbrushes.

Some electric toothbrushes use non-rechargeable batteries, some use rechargeable batteries that are physically connected to two or more external connectors that interface with matching connectors on a base station. But in an inductive recharging system for an electric toothbrush, there are no such external connects. Instead, a first transformer in the base receives the primary voltage from either a wall source, or a stepped down voltage from some internal circuitry, and creates a time-varying magnetic field through the effect of a ferromagnetic iron core used in the base transformer. The time-varying magnetic field permeates into the secondary transformer core in the electric toothbrush, and a time-varying voltage is produced on the windings that surround the secondary transformer core. This voltage is fed to internal circuitry where it is rectified and filtered and then input to the battery to recharge it. The same general principles apply to electric vehicle inductive charging systems.

One item briefly discussed above is the time varying aspect of the AC voltage, and hence the time-varying aspect of the magnetic fields in both the primary and secondary transformer cores. Typically, house current in the U.S. operates at about 60 hertz (Hz), or cycles per second. The problem with using a voltage that oscillates at 60 Hz, is that the size of the components in an inductive charging system is inversely proportional to the frequency, and thus the lower the frequency of the voltage, the greater the size of the inductive charging system. As those of ordinary skill in the automotive industry can attest, size is extremely critical to vehicle manufacturers because it is very important to automotive owners. The size and weight of an object directly affects the fuel mileage of the vehicle. Thus in other inductive charging systems, high frequency voltages, normally above 10 kHz, have been used to transfer power by radiation and tuned coils. There is, however, a cost associated with the use of higher frequency voltages and that is the subsequent loss of efficiency. The higher the frequency at which the charging system operates, the less efficient is the charging system. A less efficient charging system means that much more power must be input into the primary side of the recharging system resulting in greater cost.

FIELD OF THE INVENTION

The present invention relates to inductive proximity charging. More particularly, the invention relates to a system and method for increasing the efficiency and reducing the noise of a gapped transformer used in inductive charging of a vehicle and to a self-aligning proximity recharging station for a parked vehicle.

BRIEF DESCRIPTION OF THE PRIOR ART

Gapped transformers are transformers that are formed with two component pieces known as cores. Gapped transformers generally are less efficient for similarly sized and configured transformers than non-gapped transformers which are manufactured as one continuous iron core. As used herein, efficiency is measured as the ratio of power output by the secondary windings of the gapped transformer to the power input by the primary windings of the gapped transformer, which is usually connected to some primary source of power, normally 120 or 240 volts alternating current (VAC).

Thus, a general need exists for gapped transformers for inductive charging that can increase efficiency and minimize induced noise.

SUMMARY OF THE INVENTION

It is therefore a general aspect of the invention to provide a system and method for reducing induced noise, increasing the efficiency of a gapped transformer used in inductive charging, and a self-aligning proximity recharging station that will obviate or minimize problems of the type previously described.

According to a primary object of the invention, the apparatus for charging a battery in a vehicle includes a fixture having an interface plate which is movable in a number of directions. The gapped transformer includes a primary coil mounted on the interface plate and secondary coil mounted on the vehicle. A displacement mechanism is connected with the interface plate to position the primary coil proximate to the secondary coil to maximize the inductive transfer of power from the primary coil to the secondary coil which is used to charge the battery.

In one embodiment, the displacement mechanism includes a guide plate mounted on the interface plate. When a vehicle is parked adjacent to the fixture, a member on the vehicle engages the guide plate to displace the interface plate laterally and longitudinally relative to the vehicle to align the primary coil with the secondary coil. In addition, a spring connected with the interface plate displaces the interface plate vertically to position it closer to the secondary coil.

In a preferred embodiment, the interface plate is positioned relative to the vehicle by wireless communication system. The transformer includes control modules connected with the primary and second coils, with each module including a wireless communication device. When the vehicle is parked adjacent to the fixture, a low level of AC current is supplied to the primary coil to induce an AC current in the secondary coil. The level of the induced current in the secondary coil is transmitted to the control module connected with the primary coil. The control module activates the displacement mechanism to move the interface plate laterally, longitudinally, and vertically to position the primary coil proximate to the secondary coil in a position to maximize the inductive transfer of power. Once properly positioned, the level of AC current delivered to the primary coil is maximized to inductively transfer the current to the secondary coil where it is delivered to a charger to charge the vehicle batter.

The transformer further includes first and second cores for the primary and secondary windings, respectively, each of the cores including first, second, and third pole areas which are separated by first, second and third air gaps, respectively, when the primary core is positioned adjacent to the secondary core.

The transformer cores are formed in a flared C configuration and a semi-permeable magnetic membrane coats the poles on each core. The membrane is formed of an epoxy binder with a ferromagnetic material embedded therein.

BRIEF DESCRIPTION OF THE FIGURES

Other objects and advantages of the present invention will become apparent from a study of the following specification when read in conjunction with the accompanying drawing, in which:

FIGS. 4 and 5 top and side views, respectively, of the self-aligning inductive AC power transfer system as shown in FIG. 1 for charging a vehicle;

FIG. 6 is front view of a floor mounting system for the charging portion of the system shown in FIGS. 4 and 5;

FIG. 8 is a side view of a gapped transformer for use in the power transfer system according to the present invention;

FIG. 9 is a view taken along line 9-9 of FIG. 8 showing a first pole cross sectional surface area of the secondary core of the gapped transformer of FIG. 8;

FIG. 10 is a cross sectional view taken along line 10-10 of FIG. 8 showing a first core cross sectional surface area of the secondary core of the gapped transformer shown in FIG. 8;

FIG. 21 is a front view of a vehicle induction coil according to an embodiment of the present invention;

FIG. 24 is a front perspective view of a floor mounting system that can be used with a self-aligning inductive alternating current (AC) power transfer system according to the present invention;

FIG. 25 is a top view of the floor mounting system of FIG. 24;

FIG. 26 is a front cut-away perspective view of the floor mounting system of FIG. 24;

DETAILED DESCRIPTION

Figure 1:
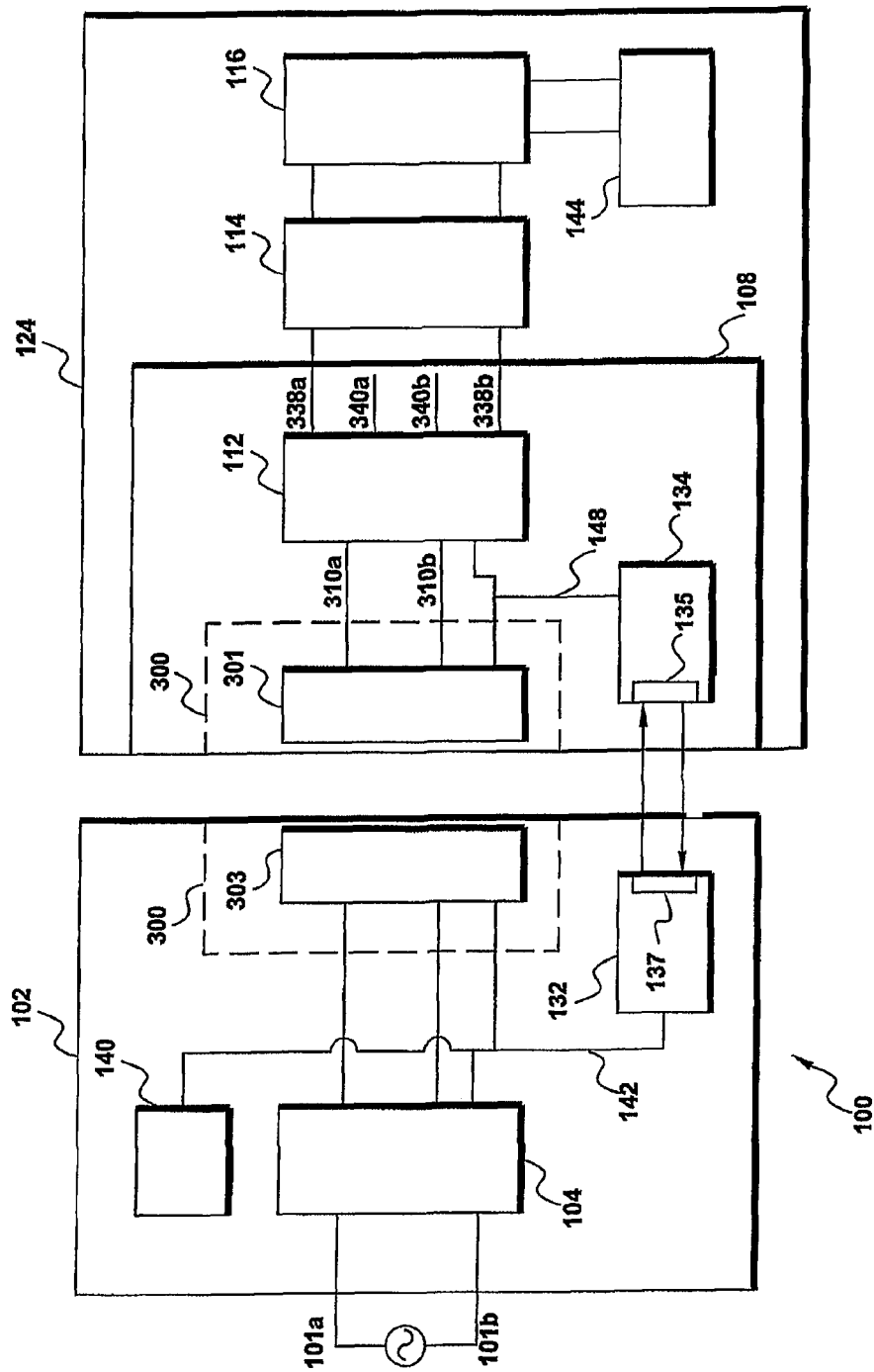
FIG. 1 is a block diagram of a self-aligning inductive alternating current (AC) power transfer system according to a first embodiment of the present invention.

The self-aligning AC power transfer system (PTS) 100 according to the invention will initially be described with reference to FIG. 1 The system 100 includes a floor mounting station (FMS) 102 and a vehicle unit 108. Floor mounting station 102 includes a station electronic power transfer control unit (station control unit) 104, a station computer control and communications module 132, station unit indicators 140, and a station induction coil 303 which is part of an inductive, low noise, high efficiency AC power transfer system 300. Vehicle unit 108, which is mounted to and within a vehicle 124, includes a vehicle induction coil 301 (also part of the inductive low noise, high efficiency AC power transfer system 300), a vehicle electronic power transfer control unit (vehicle control unit) 112, and a vehicle computer control and communications module 134. Further shown in FIG. 1 as part of vehicle 124 are a charger 114, a battery 116, and an electrical engine 144. The floor mounting station is shown in more detail in FIGS. 4-6 and FIG. 7 illustrates the system architecture for the self-aligning power transfer system 100 according to the invention.

Self aligning power transfer system 100 operates to transfer electrical power in an efficient and low-noise manner to vehicle 124 having batteries 116 that require recharging. Generally, such vehicles will be motor vehicles, but such vehicles can also include airplanes, including unmanned aerial vehicles, civilian and military aircraft, including helicopters, gyroplanes, and all types of fixed and rotary winged aircraft. Furthermore, self aligning power transfer system 100 can be used to recharge batteries 116 that are used in boats, submarines, and any and all types of water borne vessels (e.g., hydrofoils, hovercraft, ground-effect vehicles, among others). Other, non-limiting examples of vehicles that can use self aligning power transfer system 100 for recharging batteries 116 include motorcycles, scooters, trucks, and recreational vehicles.

Figure 2:
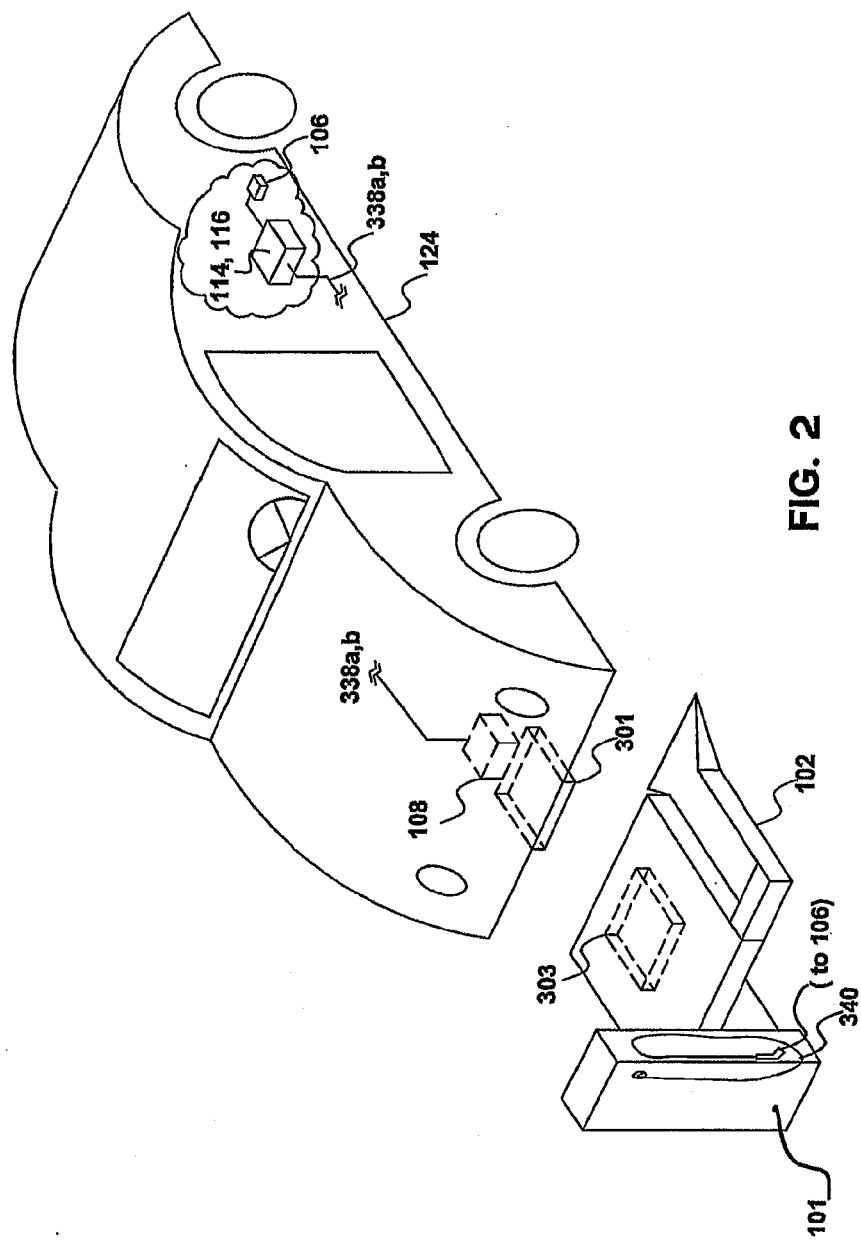
FIG. 2 is a schematic view of a charging station and the vehicle incorporating the self-aligning inductive AC power transfer system of FIG. 1.

FIG. 2 illustrates the self-aligning inductive power transfer system 100 as shown in FIG. 1 according to an exemplary embodiment. In FIG. 2, vehicle 124 includes a vehicle unit 108 having a vehicle induction coil 301 which is visible on the front-bottom of vehicle 124 as it approaches floor mounting station 102. Floor mounting station 102 is electrically connected to a power grid. The power from the mounting station is rectified and filtered and its frequency is changed prior to being input to station induction coil 303 that is visible on the top of floor mounting station 102. The operator of the vehicle 124 will use indicator lights 140 to guide the vehicle 124 to substantially close to the proper position, and floor mounting station 102 can self-align itself such that the two induction coils are neatly aligned as will be developed in greater detail below.

The self aligning power transfer system 100 transfers power to vehicle 124 using inductive coupling. In inductive coupling, an alternating current magnetic field is generated in the primary induction coil, and is transferred to, or coupled to, a secondary induction coil that is a component of the vehicle. There, the alternating current voltage is output from the secondary induction coil to a charger, which converts the AC voltage to a direct current (DC) voltage that is used to charge the rechargeable battery. In order to more efficiently transfer the power inductively, the self aligning power transfer system 100 uses specially shaped transformer cores that efficiently transfer the magnetic field from the primary induction coil through an air gap to the secondary induction coil with a minimum of loss. Furthermore, the specially shaped transformer cores minimize induced noise that is a direct result of the choice of the AC frequency. According to exemplary embodiments, the AC voltage can alternate at a frequency range between about 60 Hz to about 1200 Hz. According to a preferred embodiment, and to minimize the size and weight of the components, a frequency of about 400 Hz is used for the AC voltage. A lower AC voltage frequency, for example about 60 Hz, would facilitate production and manufacturing of the self aligning power transfer system 100, but the size of the components is inversely proportional to the AC frequency. Also, losses due to radiated effects increase with lower frequencies, or decrease with higher frequencies. Although frequencies above 400 Hz could also be used, as they become smaller components that operate at those frequencies are generally more expensive and create additional engineering difficulties.

Figure 16:
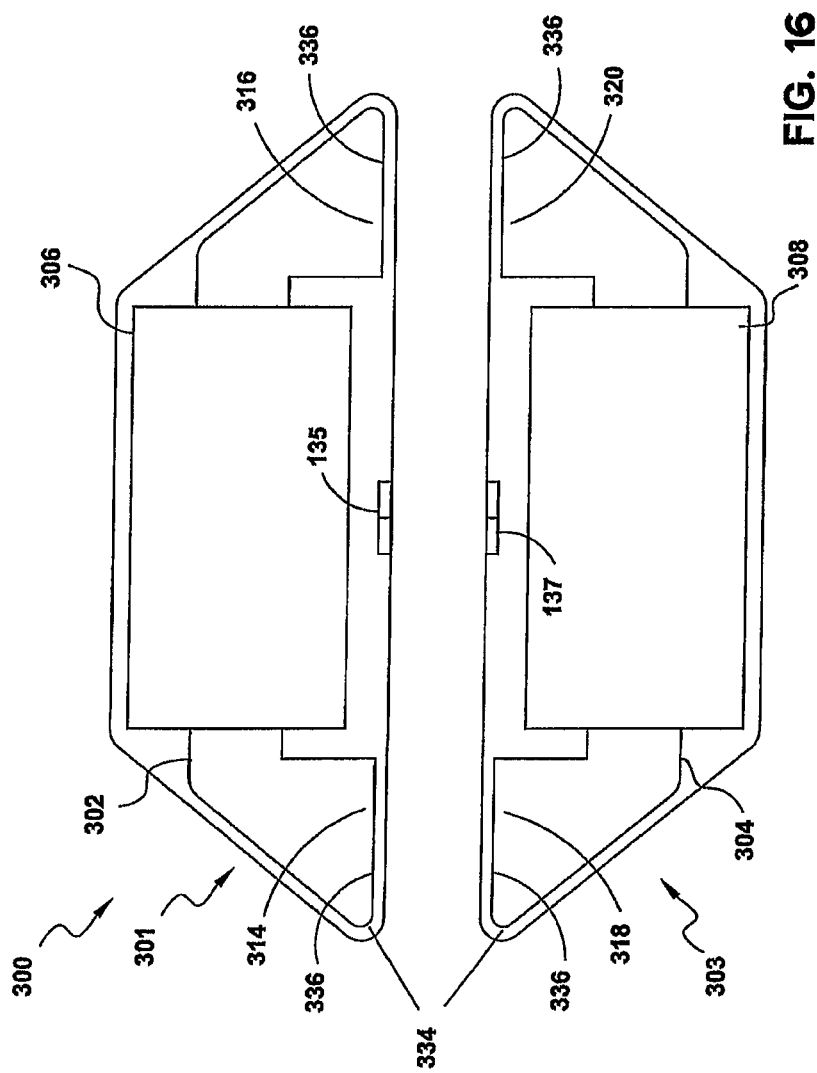
FIG. 16 is a side cut-away view of the gapped transformer of FIG. 14 including a hermetic epoxy sealing case and a semi-permeable magnetic membrane according to an embodiment of the present invention.

According to a further exemplary embodiment, self aligning power transfer system 100 uses a special semi-permeable magnetic membrane 336 (FIG. 16) over the surfaces of the primary and secondary induction coils 303, 301 that efficiently transfers the magnetic field from the primary induction coil 303 through an air gap to the secondary induction coil 301 with minimum loss. Self aligning power transfer system 100 includes a floor mounting station 102 that houses the primary induction coil 303, and other components, and that can self-align the primary induction coil 303 to the secondary induction coil 301 in the vehicle 124 as the vehicle automatically aligns with the floor mounting station 102. Alignment of the primary and secondary induction coils 303, 301 increases the efficiency of the power transfer from the floor mounting station 102 (i.e., the primary induction coil 303) to the vehicle and the secondary induction coil 301.

Referring back now to FIG. 1, station computer control and communications module (station module) 132 is linked to one or more of the other components in floor mounting station 102 by a floor mounted station data/control computer bus (station bus) 142, and vehicle computer control and communications module (vehicle module) 134 is linked to one or more of the other components in vehicle unit 108 by a vehicle unit data/control computer bus (vehicle bus) 148. According to an exemplary embodiment, buses 142, 148 can by any type of command/control/communication buses commonly used in the computer industry such as a universal serial bus (USB), a serial buses, a parallel bus, or any of a multitude of other buses known for transmitting and receiving commands and/or data. According to still another exemplary embodiment, station module 132 and vehicle module 134 communicate with each other, either wirelessly, via an electrical/mechanical connection (i.e., wired connectors), or a combination of both. If the communication path is at least partially wireless, it can be in the form of infra-red, radio-frequency (RF), microwave, laser, light emitting diode (LED), or even ultra-sonic wireless communications, among other types. In operation, both station and vehicle modules 132, 134 monitor the status of the components in their respective units (floor mounted station unit 102, and vehicle unit 108), and data/information can be transmitted to the station module 132, which can store the data, or transmit it to a central unit (not shown) for further processing and reporting needs. Alternatively, station module 132 collects and utilizes the collected data to monitor and keep track of the performance of vehicle 124 as well as the components of vehicle unit 108.

According to a preferred embodiment, station module unit 132, through the use of communication devices 135, 137, automatically aligns station induction coil 303 with vehicle induction coil 301 through use of feedback control. According to alternative embodiments, floor mounting station 102 guides the vehicle into an optimum docking position that is within a range of control of floor mounting station 102. Station module unit 132 provides indications to the operator of vehicle 124 to affect such position. Once vehicle 124 has achieved a near alignment position, station module 132 provides a low level amount of power to station induction coil 303, and vehicle module unit 134 provides a dummy load for vehicle induction coil 301 so that its output power can be measured. The measured output power is then communicated back to station module unit 132 via communication modules 135, 137, and the efficiency is measured. Station module unit 132 positions the station induction coil 303 until a maximum power efficiency is achieved. Once maximum power transfer efficiency is achieved, station module 132 provides maximum input power to station induction coil 303 and vehicle module unit 134 allows the output power to be sent to vehicle control unit 112 to recharge battery 114. A detailed discussion of automation of the self-alignment procedure is set forth below.

Figure 3:
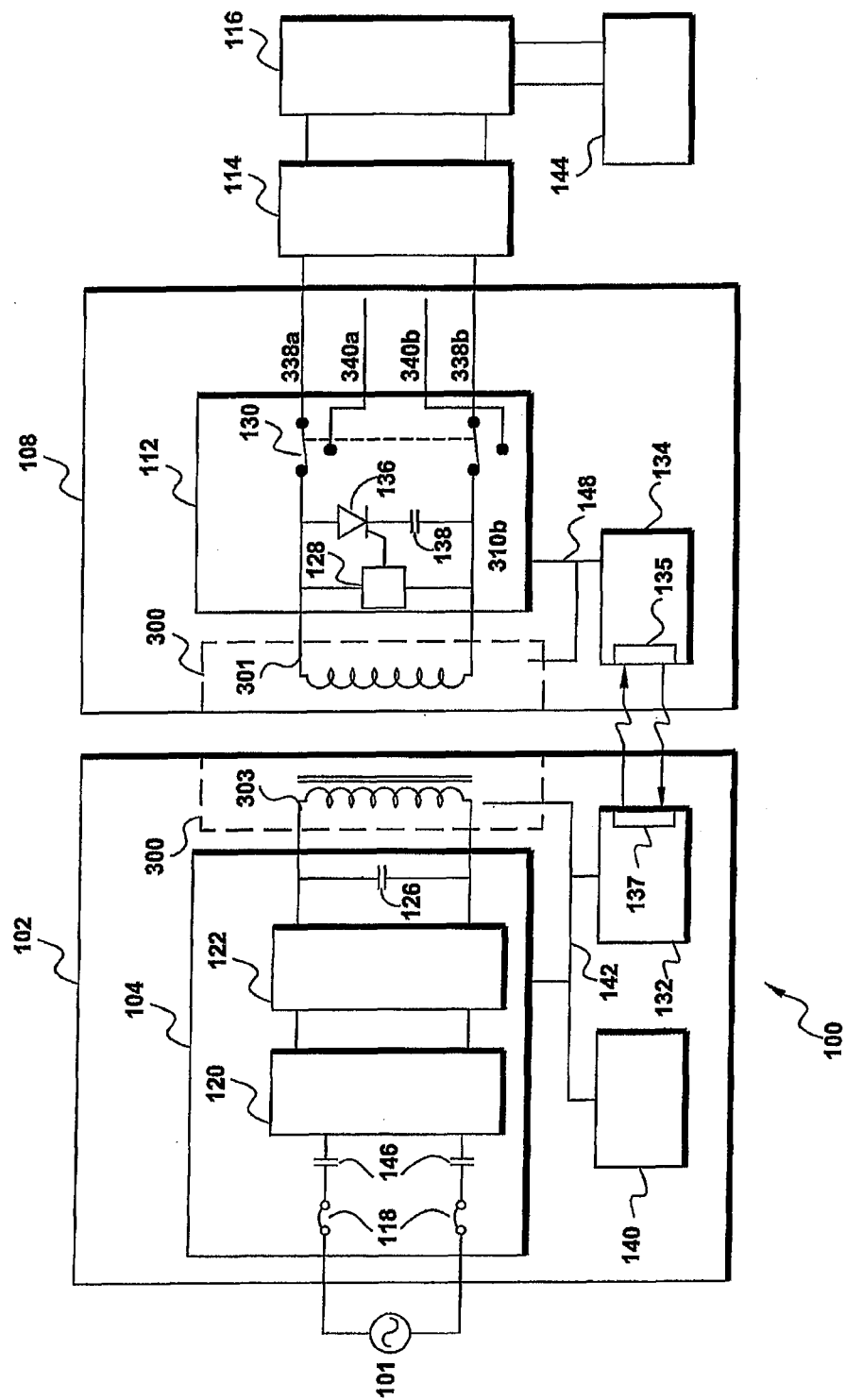
FIG. 3 is a more detailed block diagram of the components of the self-aligning inductive AC power transfer system illustrated in FIG. 1.

Referring now to FIGS. 1 and 3, AC input power 101 enters floor mounting station 102 and is received by station electronic power transfer control unit (station control unit) 104. Station control unit 104 includes circuit breakers 118, and control contactors 146. Control contactors 146 are simply high power switches that safely handle switching of high voltage AC such as 240 VAC. The power then enters rectifier and filter unit 120 which rectifies the input power to produce a direct current voltage and filters it. According to an exemplary embodiment, rectifier and filter unit 120 is a full wave rectification device which forms a better utilization factor of input power than half-wave rectification devices which are more commonly used for low-power devices. The filters in the rectifier filter unit 120 reduce high and low frequencies that might otherwise induce physical and electrical noise into the self-aligning power transfer system 100 and vehicle 124.

Rectifier and filter unit 120 is composed of an inductive-capacitance (LC) section. Unit 120 may also be a power factor correcting (PFC) device producing the required DC voltage for use by the medium frequency inverter 122. Rectifier and filter unit 120 is preferably a single phase or a three phase bridge rectifier and filter or PFC in which the 240 VAC, 60 Hz input power is changed to a direct current (DC) voltage with less than about 5% ripple for use by medium frequency inverter 122.

Following rectifier and filter or PFC unit 120 is a medium frequency inverter 122, which creates a substantially sinusoidal voltage or square wave voltage with a pre-selected frequency. According to various embodiments, the pre-selected frequencies of the input power to vehicle induction coil 301 range from about 60 Hz to about 1200 Hz. Medium frequency as used herein refers to a range of frequencies in power usage from about 120 to about 1200 Hz. Frequencies below 120 are referred to as low frequencies and frequencies at or above about 1200 Hz are referred to as high frequencies. Medium frequency inverter 122 is a full bridge insulated gate bipolar transistor (IGBT), or MOSFET inverter that uses four high voltage IGBT's or MOSFET's, two designated as high side IGBT's or MOSFET's and the other two as low side IGBT's or MOSFET's. According to a preferred exemplary embodiment, to keep the total power losses low and the total conversion efficiency high, medium frequency inverter 122, which can be characterized as a dc-ac inverter circuit, combines low and high side IGBT's or MOSFET's to generate a single-phase wave at any frequency between about 120 and about 1000 Hz. Capacitor 126 and station induction coil 201, 301 are tuned to substantially maximize power transfer.

A power resonant capacitor 126 is connected with the medium frequency inverter 122. Resonant capacitor 126 effectively supplies reactive power to the system in the form of a resonant LC circuit which includes the primary of primary station coil 303.

Input electrical power enters station induction coil 303 between 100-240 VAC and at medium frequencies and creates a changing magnetic flux field in the ferro-magnetic core of station induction coil 303, according to known electromagnetic principles. The magnetic field flows across an air gap and is coupled to the ferro-magnetic core of vehicle induction coil 301. The magnetic field reenters the station induction coil 303 through the air gap and alternates as the charging input power alternates in a substantially sinusoidal fashion. As an alternate embodiment, vehicle induction coil 301 may be a coil composed of conductive material without a ferro-magnetic core. A resultant output voltage is produced according to known electromagnetic and transformer principles.

As voltage is induced in the vehicle induction coil 301, a trigger tuning circuit 128, along with silicon controlled rectifier 136, switches in and out circuit capacitor 138, and thereby controls the voltage regulation of vehicle induction coil output voltage (induction coil output voltage). Alternatively the frequency and/or duty cycle of power system 122 is changed to maintain voltage regulation. A wireless communications system 135 and 137 provides this alternative control feature. Capacitor 138 forms a coil tuning system with the reactance of vehicle induction coil 301 to substantially maximize power transfer. Induction coil output voltage is coupled to charger 114 of vehicle 124 through a transfer switch 130. Transfer switch 130 isolates conduction cable 340 (FIG. 2) from the self aligning inductive power transfer system 100, or isolates self aligning inductive power transfer system 100 from the conductive cables. Battery 116 can then be charged for use to drive electric engine 144. Conduction cable 340 can be coupled to vehicle conduction receptacle 106, which carries conducted power from station unit 108 to vehicle 124, charger 114, and ultimately battery 116.

In FIG. 8 is shown a high-noise, low-efficiency power transfer system (first PTS) 200, using a gapped transformer with an air gap 221a, 221b between primary induction coil 203 and secondary induction coil 201.

It is known in the power transformer arts that a magnetic field is created when current flows through a conductor. In most cases, the conductor is a wire, and in the case of a transformer, the wire is wrapped around a ferro-magnetic core, usually formed of ferro-magnetic iron. Wrapping the wire causes the magnetic field to be concentrated within the ferro-magnetic iron core.

It is further well known that a changing or alternating magnetic field will induce a charging or alternating current in a conductor, if that conductor is cut by the changing or alternating magnetic field. This generally explains how power transformers operate: a magnetic field is created by the AC input current to the transformer, the AC magnetic field travels throughout the ferro-magnetic iron core around which the input power wires are wrapped, and a voltage is induced on the secondary, or output wires that are also wrapped around the same ferro-magnetic iron core.

If first PTS 200, shown in FIG. 8, were built conventionally, that is, with no air gaps 221a, 221b, then it would operate as any normal electrical power transformer. However, first PTS 200 can be used to induce electric power in the form of a magnetic field across air gaps 221a, 221b such that the electric power can be transmitted wirelessly to a different location, and no physical interface (i.e., connectors) is needed to transmit the electric power. As discussed above, one particular exemplary embodiment that makes use of such wirelessly transmitted power is an electric vehicle. Referring again to FIG. 8, first PTS 200 includes secondary induction coil 201 and primary induction coil 203. Secondary induction coil 201 is made up of secondary core 202 and secondary windings 206 and secondary core 202 comprises first pole 214, with a cross sectional area 224 (FIG. 9), and second pole 216, with a cross sectional area 226. Primary induction coil 203 is made up of primary core 204, and primary windings 208, and primary core 204 comprises first pole 218 with a cross sectional area 228, and second pole 220 with a cross sectional area 230.

Secondary induction coil 201 is located in vehicle 124 that requires recharging of its rechargeable batteries 116. As discussed in greater detail below, primary induction coil 201 is preferably located in floor mounting station (FMS) 102, or some other suitable enclosure, and when secondary induction coil 201 is proximately located relative to primary induction coil 203, an indication will alert the operator of vehicle 124. The floor mounting system 102 applies a suitable AC voltage to primary input voltage leads (primary leads) 212a, 212b of the transformer. According to an exemplary embodiment, floor mounting station 102, which is discussed in greater detail below, contains suitable logic and electronic and/or mechanical controls that facilitate switching on-and-off of power to primary induction coil 203. According to a preferred embodiment, the logic and control circuitry of floor mounting station 102 only allows power to be applied to primary induction coil 203 when secondary induction coil 201 is located at a close enough distance such that effective proximity inductive transfer of electrical power can occur.

As those of ordinary skill in the art can appreciate, regardless of how close secondary induction coil 201 is located to primary induction coil 203, an air gap 221a, 221b will exist between the two poles of the two cores of the two induction coils. That is, as shown in FIG. 8, air gap 221a exists between first pole 214 of secondary core 202 and first pole 218 of primary 204, and air gap 221b exists between second pole 216 of secondary core 202 and second pole 220 of primary 204. There is a reactance and permeability factor that must be taken into account when analyzing the flow of magnetic fields through open space such as air gaps 221a, 221b. The permeability and reactance of air are fixed quantities, and for purposes of this discussion, can be presumed to act as an impedance to the transfer of magnetic fields 232a, 232b through air gaps 221a, 221b.

If secondary induction coil 201 is located at the proper position for effective proximity inductive transfer of electrical power to occur, floor mounting station 102 provides input power to primary induction coil 203. When input power it is applied to primary core 204, via primary input voltage leads (primary leads) 212a, 212b, magnetic flux field 232a, 232b exists throughout secondary core 202 and primary core 204, and through first and second air gaps 221a, 221b. Because of the air gaps, magnetic field 232a, 232b will tend to flow in a bulging, outward manner between first pole 218 of primary core and first pole 214 of secondary core, and in a substantially same manner with respect to second pole of primary core 220 and second core of secondary core 216. The bulging, outward flow of magnetic field 232a, 232b reduces the efficient transfer of electrical energy between primary core 204 and secondary core 202. As a result, a significantly greater amount of input power is required for a given amount of output power. For example, if the efficiency is reduced by 50%, then if 1000 watts of charging power was required to recharge battery 116 of vehicle 124, then at least 2,000 watts of power input to primary induction coil 203 would be required. This would necessitate larger windings to compensate for the additional heat that would have to be dispersed, as well as greater cooling requirements to dissipate the larger amounts of heat that would be generated.

FIG. 9 illustrates a first pole cross sectional surface area of the secondary core of the gapped transformer as shown in FIG. 8, and FIG. 10 shows a first core cross sectional surface area of the secondary core of the gapped transformer of FIG. 8. One reason for the ineffective transfer of magnetic flux field 232a, 232b across air gap 221a, 221b is that the ratio of cross sectional area of first pole 214 of secondary core to the cross sectional area 223 of secondary winding 206 is substantially unitary, or that is, about 1. An improvement to the design and shape of first PTS 200 is shown in FIGS. 11-16.

Figure 11:
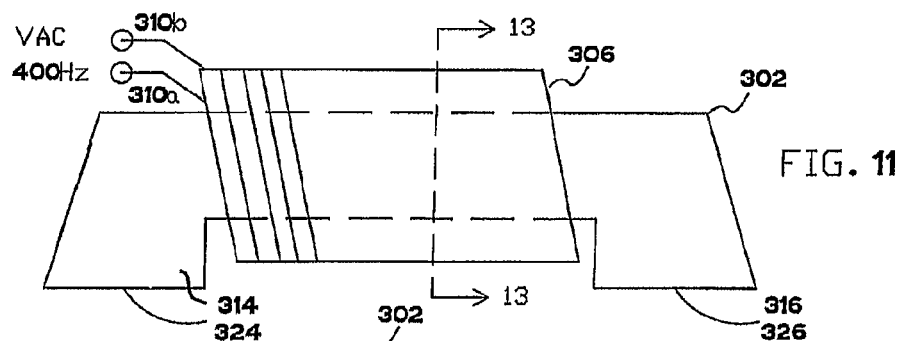
FIG. 11 is a side view of secondary core of a gapped transformer according to an embodiment of the present invention.
Figure 12:
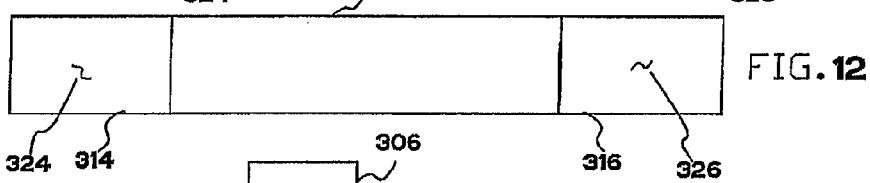
FIG. 12 is a bottom view of the secondary core of FIG. 11 illustrating first and second pole cross sectional surface areas.
Figure 13:
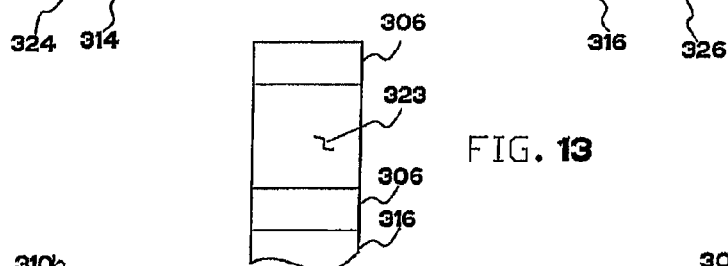
FIG. 13 is a cross sectional view along line 13-13 of FIG. 11 showing a first core cross sectional surface area of the secondary core.
Figure 14:
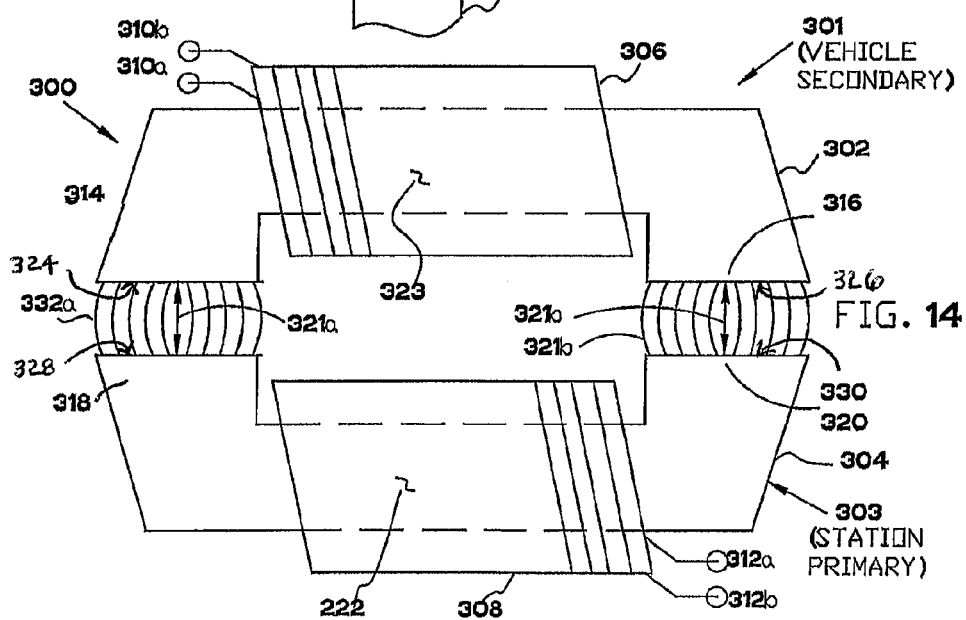
FIG. 14 is side view of a gapped transformer showing an air space between a primary core and secondary core according to an embodiment of the present invention.
Figure 15:
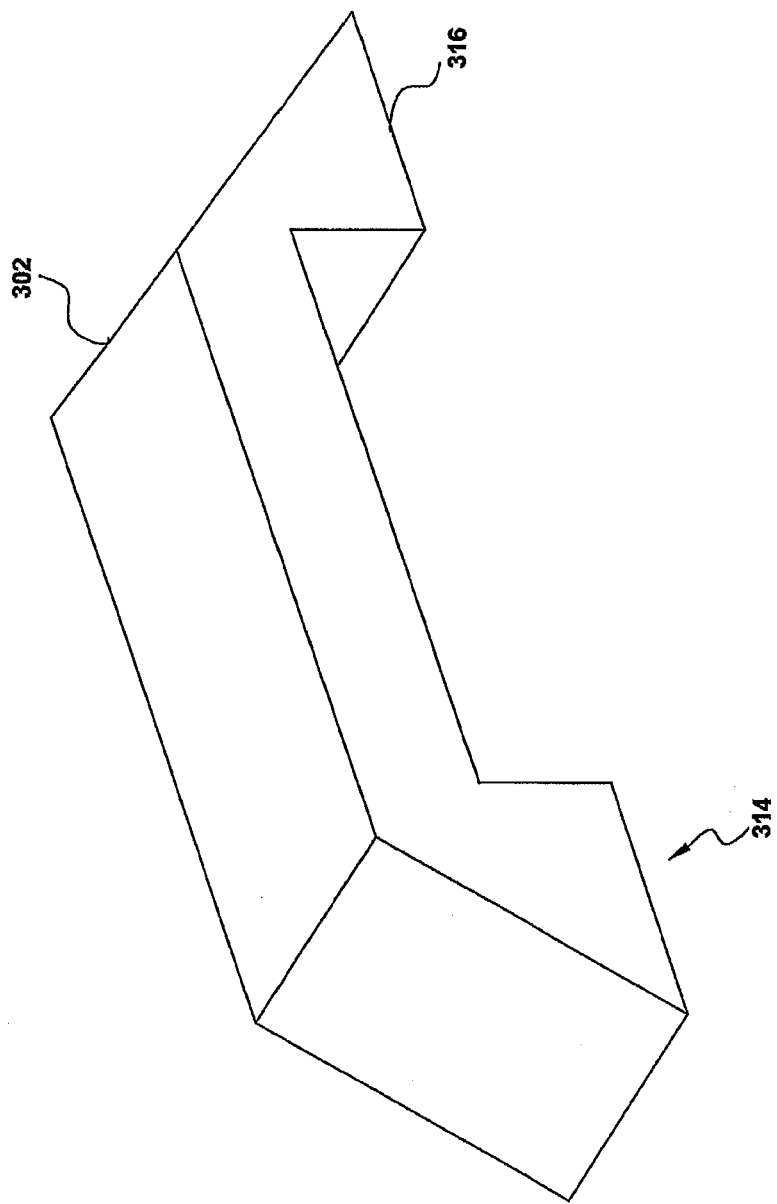
FIG. 15 is a front perspective view of the secondary core of FIG. 11.

FIG. 14 illustrates a low-noise high-efficiency power transfer system (second PTS) 300, using a gapped transformer with an air gap 321a, 321b between primary induction coil 303 and secondary induction coil 301 according to a preferred embodiment. FIG. 11 is a side view of a novel flared C shaped secondary core 302 of second PTS 300 according to an exemplary embodiment, FIG. 12 is a bottom view of the flared C shaped secondary core 302 of second PTS 300 further illustrating cross sectional area 324 of the first pole 314 of secondary core and cross sectional area 326 of the second pole 316 of secondary core, and FIG. 13 is a cross sectional view along line 13-13 of FIG. 11, showing cross sectional area 323 of the secondary winding 306 of secondary core 302 of second PTS 300. FIG. 15 is a front perspective view of the secondary C shaped secondary core as shown in FIG. 11. According to an exemplary embodiment, first pole 314 of secondary core 302 and second pole 316 of secondary core 302, as shown in FIG. 15, are notably larger than first pole 214 of secondary core 202 and second pole of secondary core 202 of first PTS 200. The shape of secondary core 302 (and similarly, primary core 304) is preferably a C shape with flared portions at the top and bottom portions of the C. This flaring provides a larger surface area for magnetic field 332a, 332b to flow through and into, and which leads directly to the increased efficiency and low noise effects of second PTS 300.

The relative permeability of iron is generally in the thousands and there is a direct relationship between the permeability value and the ability of the magnetic field to flow. Thus, the higher the permeability, the easier the magnetic field will flow. That is why most transformers are fabricated from iron. Conversely, the lower the permeability, the less able the magnetic field can flow. Air is generally thought to have a relative permeability value of about 1. Therefore, any air gap between the primary and secondary cores 202, 204; 302, 304, will negatively affect the ability of the magnetic field to flow. In other words, the magnetic field will flow thousands of times better in the iron than through the air.

Second PTS 300 comprises vehicle (secondary) induction coil 301, and station (primary) induction coil 303. Secondary induction coil 301 includes secondary core 302 and secondary windings 306, and secondary core 302 comprises first pole 314 with a cross sectional area 324, and second pole 316 with a cross sectional area 326. Primary induction coil 303 includes primary core 304, and primary windings 308, and primary core 304 has a first pole 318 with a cross sectional area 328 and a second pole 320 with a cross sectional area 330.

Operation of second PTS 300 is similar to that of first PTS 200. Notably however, the ratio of cross sectional area of first pole 314 of secondary core 302 (seen in FIG. 12) to cross sectional area 323 of secondary winding (seen in FIG. 13) is between about 2.0 to about 5.0. Preferably, the ratio of cross sectional area of first pole 314 of secondary core to cross sectional area 323 of secondary winding is about 3.2. Increasing the ratio of the area of the pole area to the winding area of secondary core 302 and primary core 304 leads to magnetic field 332a, 332b being substantially contained within a volume of space essentially defined by the boundaries of the pole areas of the cores as seen in FIG. 14.

The flux density of the magnetic field is directly proportional to the area of the iron that the magnetic field is traveling through. In the air gap between primary and secondary cores 302, 304, the low permeability of the air acts as an impediment to the flow of the magnetic field. As a result an increase in fringing occurs. The magnetic field seeks a different path through which to flow, and therefore diverges greatly from its intended path, straight across the air gap. It has been determined that if the flux density can be decreased in that the air gap area by increasing the pole area relative to the cross sectional area of the winding area, then the amount of fringing is decreased dramatically, and more of the magnetic field finds its way across the air gap. Thus, the overall charging efficiency of the second PTS increases substantially. The ratio of the pole cross sectional area to that of the winding cross sectional area is preferably about 3.2.

As a result of the increase in ratio of pole to winding areas, a greater majority of magnetic flux 332a, 332b is contained and can flow unimpeded between secondary core 302 and primary core 304 and the power transfer efficiency between the power input to primary core 304 and power output from secondary core 302 increases to between about 80% to about 95%. According to a preferred embodiment, the power transfer efficiency is about 90%.

At least one additional benefit is derived from the flared C shape of secondary and primary cores 304, 302 of second PTS 300: induced noise is reduced dramatically. As discussed in greater detail above, a preferred frequency for the AC voltage is within the medium range of frequencies on the order of 400 Hz. Use of a medium frequency inverter 122 reduces the size of the components. In addition, use of frequencies in the medium range is widely used in the aircraft industry, and therefore power supply/transformer components are readily available and competitively priced. One drawback to medium frequencies is that they are substantially close to a pure "A" note (440 Hz) and are most discernable, in a negative manner, even in very noisy environments.

Second PTS 300 substantially reduces inducted noise by containing magnetic field 232a, 232b, as discussed in greater detail below, within the larger area of its poles 314, 316, 318, and 320. As a result, induced oscillations of different components of self-aligning PTS 100 and vehicle 124 were reduced, on the order of at least several decibels (dB's). According to an exemplary embodiment, induced noise was reduced between a first range of dB's and induced noise was reduced between a second range of dB's.

Figure 17:
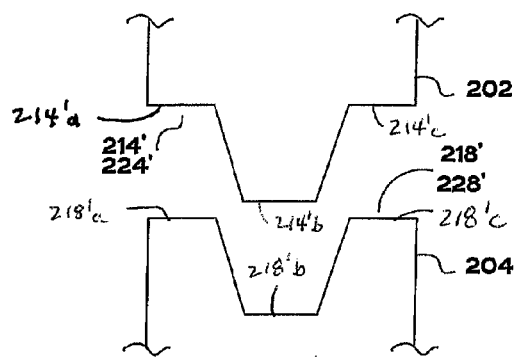
FIG. 17 is a side view of primary and secondary cores of a gapped transformer according to an alternate embodiment of the present invention.
Figure 18:
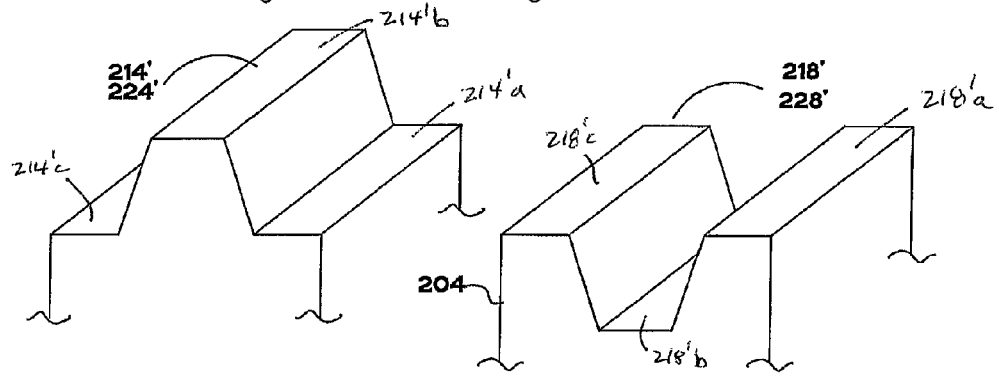
FIG. 18 is a perspective view of the cores of FIG. 17.

The pole areas 214, 216, 218, and 220 of vehicle core 202 and station core 204 need not be substantially flat, as FIGS. 17 and 18 illustrate. As discussed above, increasing the ratio of area between the pole and winding sections of the core increases the capability of magnetic flux field 232 to travel across air gaps 221a, 221b. The ratio of area can be increased without altering the overall dimensions of pole areas 214, 216, 218, and 220 of vehicle core 202 and station core 204, as shown in FIG. 17. In FIG. 17, which is a front view of vehicle core 202 and station core 204 according to an alternate exemplary embodiment, the outer dimensions of the pole sections remain the same as shown in FIGS. 11-15, but the surface area, the cross sectional area of the first and second poles of the vehicle core 202 and station core 204 has increased substantially because of the modified U shape of the pole surfaces. The ratio of area of the pole to core winding areas now increases by a first percentage. Other configurations are possible. Such alternative configurations of the pole surfaces will necessitate a modified approach to docking between vehicle 124 and floor mounting station 102 as will be discussed in greater detail below.

Figure 19:
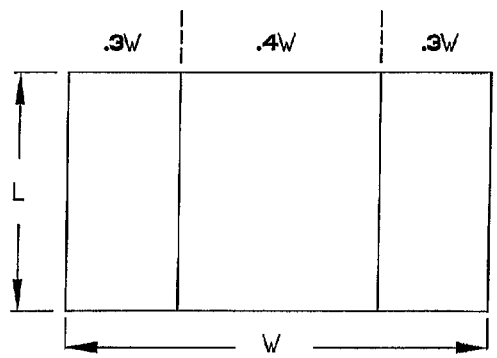
FIG. 19 is a top view of a pole of one of the primary or secondary cores of FIG. 17.
Figure 20:
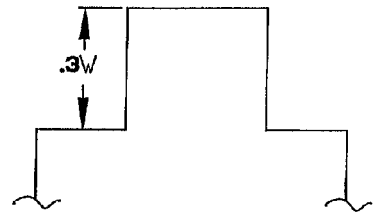
FIG. 20 is a side view of the pole of FIG. 19.

Referring now to FIGS. 17 and 18, an alternate embodiment of the core pole areas is shown. As discussed above, adding area to the first pole of secondary core 214 and first pole of primary core 218 permits an easier flow of magnetic flux field 232 across the small gap between vehicle core 202 and station core 204, substantially increasing its efficiency and substantially decreasing induced noise/hum in vehicle 124. The arrangement of pole areas 214' and 218' increases the surface area because of the trapezoid extension and recess formed in the two cores 202, 204. In FIGS. 17 and 18, three pole surface areas 214'a, b, and c are shown for the vehicle core 202 and three pole surface areas 218'a, b, and c are shown for the stator core 204. Similarly, the extension and recess could be square, triangular, circular, oval, parabolic or any of a multitude of shapes. Each such change in configuration adds more surface area 222 than if a flat surface were used, with the length and width constraints of the cross-sectional area of the winding 208. By way of example only, for a square extension and recess as shown in FIGS. 19 and 20, and expressing the same in percentages of length and width, an increase in area of 60% can be obtained.

Some gap between the cores 302, 304 is desirable to prevent them from sliding across each other and thereby causing undue wear to the surface of each core. The larger the gap 221a, 221b, the less efficient will be the transfer of magnetic fields 232a, 232b between the cores 302, 304. The magnetic fields 232a, 232b tend to fan out at the edges of cores 202, 204 across gaps 221a, 221b, as shown in FIG. 8. To reduce or alleviate this issue, and increase the efficiency of the system, the cores 202, 204 are substantially coated with a semi-permeable resin or epoxy material in the form of a semi-permeable magnetic membrane 336 that includes a magnetic material embedded therein as shown on cores 302, 304 in FIG. 16. In one implementation, the magnetic material embedded within the resin or epoxy material is a ferromagnetic material, such as iron or steel.

FIG. 21 shows a view of vehicle induction coil 301 as would be seen by station induction coil 303. Although only vehicle induction coil 301 is shown, a similar arrangement would be used for station induction coil 303. Secondary core 302 includes secondary winding 306 as discussed above. First and second poles 314, 316 are coated with the semi-permeable magnetic membrane 336.

The semi-permeable magnetic membrane 336 forms a hermetic coating over first and second poles 314, 316 to prevent corrosion. Semi-permeable magnetic membrane includes a ferromagnetic material 337 such as iron or steel filings embedded therein. Ferromagnetic material 337 may be formed of powdered transformer steel or similar material. Ferromagnetic material 337 is mixed into an epoxy binder and applied to first and second poles 314, 316 to form the semi-permeable magnetic membrane 336.

Ferromagnetic material 337 generally comprises about 30% to 90% or more of the semi-permeable magnetic membrane 336. In general, less than about 30% of ferromagnetic material 337 would not sufficiently increase efficiency, while greater than about 75% may become brittle. In one implementation, semi-permeable magnetic membrane 336 includes 71% powdered iron as the ferromagnetic material 337.

When implemented as powdered iron, a general implementation would include a distribution of sizes of the individual granules. The distribution includes about 70% to 75% being +325 mesh, less than about 16% being +100 mesh, with the balance of up to about 30% pan sieve. In one example, iron powder size distribution is as follows:

| | |
|---|---|
| +60 Mesh US Std Sieve | 0.0 wt % |
| +100 Mesh US Std Sieve | 10.3 wt % |
| +325 Mesh US Std Sieve | 72.0 wt % |
| +Pan Sieve | 17.7 wt % |

There are several types of resins or epoxies that can be used with specific formulations. Furthermore, the filings can be aligned or they can be placed randomly. There are several sizes of the filings, several methods of preparation, and several methods of applying the semi-permeable magnetic membrane to the poles.

The semi-permeable magnetic membrane 336 is applied to both primary core 304 and secondary core 302 to fill the gap between the cores 302, 304. Semi-permeable magnetic membrane 336 reduces friction on each core when they come into contact, thereby saving wear on the cores 302, 304. Ferromagnetic material 337 embedded in semi-permeable magnetic membrane 336 permits an appreciable increase in transfer of the magnetic field and therefore the power transfer efficiency. A 24 V drop was noted without use of ferromagnetic material 337 in semi-permeable magnetic membrane 336.

Figures 22A, 22B:
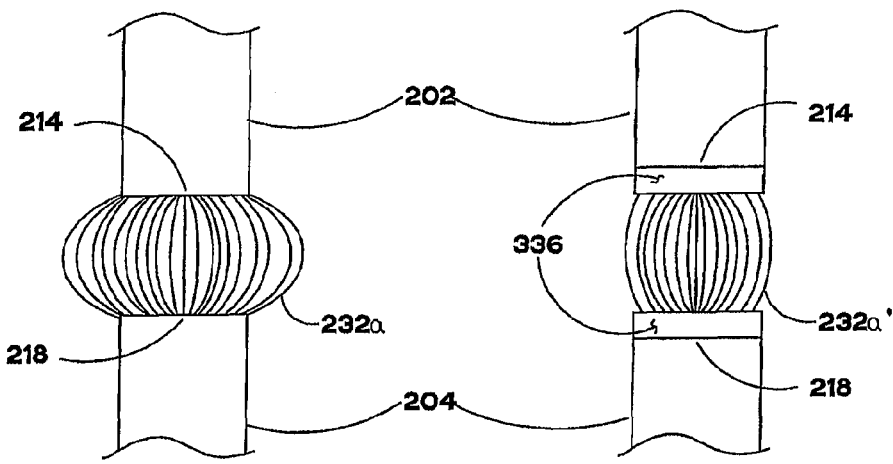
FIGS. 22A and 22B illustrate a first decrease in magnetic flux field fringing when a semi-permeable magnetic membrane is used with a first power transfer system according to an embodiment of the present invention.
Figures 23A, 23B:
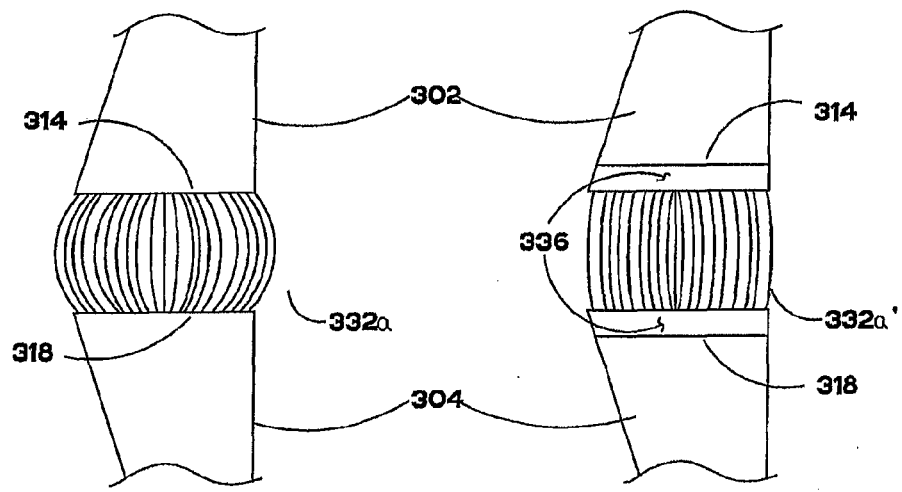
FIGS. 23A and 23B illustrate a second decrease in magnetic flux field fringing when a semi-permeable magnetic membrane is used with a second power transfer system according to an embodiment of the present invention.

FIGS. 22A and 22B illustrate a first decrease in the fringing of magnetic flux field 232a,b when a semi-permeable magnetic membrane 336 is used with first power transformer 200 according to one embodiment, and FIGS. 23A and 23B illustrate a second decrease in fringing of magnetic flux field 332a,b when a semi-permeable magnetic membrane 336 is used with second power transformer 300. FIGS. 22A and 22B illustrate the effect of use of membrane 336 with secondary core 202 and primary core 204. In FIG. 22A, there is no membrane 336 and there is significant fringing of magnetic flux field 232 as discussed in detail above. In FIG. 22B, membrane 336 (not drawn to scale) is added to the first pole of primary core 218 and the first pole of secondary core 214, and magnetic flux field 232a' is significantly reduced. The reduction in magnetic flux field 232a' is between about a first range, and the reduction in magnetic flux field 232a' is about a second percentage.

FIGS. 23A and 23B illustrate the effect of membrane 336 with secondary core 302 and primary core 304. In FIG. 23A, there is no membrane 336 and there is significant fringing of magnetic flux field 332a as discussed in detail above. In FIG. 23B, membrane 336 (not drawn to scale) is added to first pole of primary core 318 and first pole of secondary core 314, and magnetic flux field 332a' is significantly reduced. According to an exemplary embodiment, the reduction in magnetic flux field 332a' is between about a second range, and according to a preferred embodiment, the reduction in magnetic flux field 332a' is about a third percentage.

Referring now to FIG. 24, there is shown a floor mounting station (FMS) 102 that can be used with either of the first or second self or automatic aligning power transfer system 100, 200 according to a preferred embodiment of the present invention. As briefly discussed above, floor mounting station 102 can automatically self-align itself to vehicle 124 when an operator of vehicle 124 approaches the floor mounting station 102 to begin recharging battery 116. Self-aligning of floor mounting station 102 is accomplished by a three quadrant operating mechanism supported by a plurality of springs, slides, enclosures and rollers that allows interface plate 406a of floor mounting station 102 to freely and independently move in lateral, longitudinal and vertical directions as vehicle 124 moves in proximity to the floor mounting station 102. Status indicator lights on tower 402 of floor mounting station 102 indicate several different statuses of floor mounting station 102, and proximity sensors allow charging to begin when vehicle 124 is in the proper position.

The floor mounting station 102 includes tower 402, indicators 140a-d, floor mounting fixture 404, interface plate 406a having a guide plate 408 thereon, station unit enclosure 410, front mounting receptacles 416, rear mounting receptacle 418, indicator panel 420, springs 422, plate anchor 432, and inner enclosure 414, among other components. The FMS 102 further includes electronics enclosure 150, and station unit communication device 137. Electronic enclosure 150 houses station control unit 104. First or second power transfer systems 200, 300 that are part of floor mounting station 102 (and not part of vehicle 124), and station unit communication device 137 are generally housed in station unit enclosure 410. Also shown as part of floor mounting station 102 are certain components of first power transfer system 200 and second power transfer system 300, for example, primary induction coil 203, 303, hermetic epoxy sealing case 334, and semi-permeable magnetic membrane 336.

As seen in FIGS. 24-32, floor mounting station 102 is generally a rectangular shaped device with a low profile and a column-like tower 402. Tower 402 needs only be tall enough such that it can reasonably be seen by an operator of vehicle 124 which is to be positioned relative to the system. The station unit 102 and first and second power transfer system 200, 300 are designed to accommodate different brands of motor vehicles or other types electrically powered devices to be recharged. Moreover, the position of the tower 402 on floor mounting station 102 can be changed as necessary to accommodate different vehicles as FIGS. 6 and 24 illustrate. In FIG. 24, tower 402 is centrally located on floor mounting station 102 whereas in FIG. 6, tower 402 is located along a left side of floor mounting station 102 as viewed by an operator of vehicle 124 and is therefore substantially directly in front of the vehicle operator. In this case, according to a preferred embodiment, vehicle 124 is an automobile, and the location of tower 402 greatly improves docking so that near perfect alignment is achieved.

As seen in FIG. 24, interface plate 406a resides on an upper portion of station unit enclosure 410, and houses the station unit components of first and second power transfer system 200, 300, which includes primary induction coil 203, 303, and hermetic epoxy sealing case 334, and semi-permeable magnetic membrane 336. FIG. 25 is a top view of the floor mounting system as shown in FIG. 24. While the second power transfer system 300 and its components will be described, both first and second power transfer system 200, 300 are substantially interchangeable, and both can be used with the different exemplary embodiments of floor mounting station 102 as discussed herein.

Figure 27:
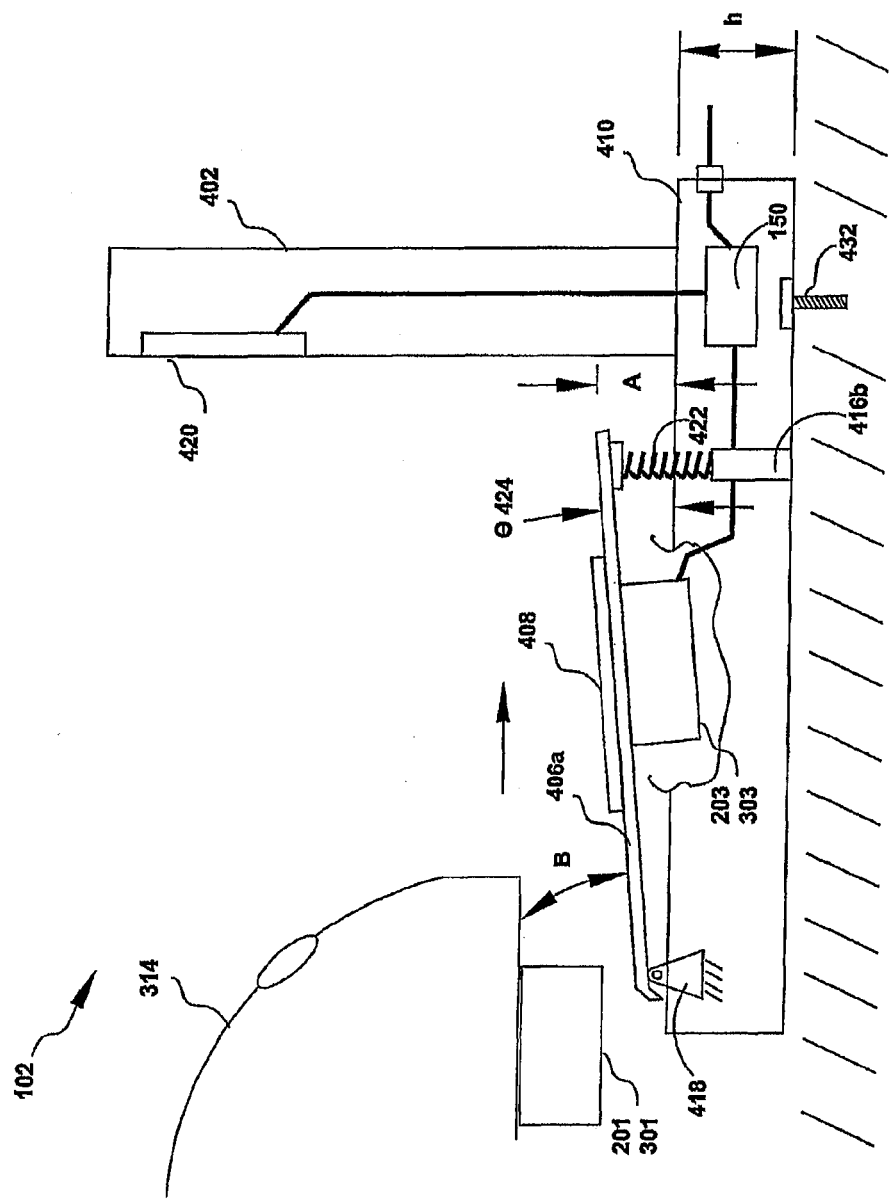
FIG. 27 is a cut-away side view of the floor mounting system of FIG. 24.

Vehicle induction coil 301 is mounted on the vehicle 124 and positioned in such a way as to be able to get as close as possible to station induction coil 303 on the interface plate 406a of the station 102 when recharging is desired. The induction coil 303 is mounted to first interface plate 406a such that first and second poles of primary core 318, 320 are flush with an upper surface of first interface plate 406a as shown in FIGS. 24, 25, and 27. First and second poles of station core 318, 320 and first and second poles of vehicle core 314, 316 are covered with semi-permeable magnetic membrane 336 to facilitate transfer of electric power inductively from station unit 102 to vehicle 124. When the vehicle 124 is properly positioned with respect to the station unit 102, the semi-permeable magnetic membranes 336 of first and second poles of station core 318, 320 and first and second poles of vehicle core 314, 316 may be very close together or touching each other. At such a positioning between vehicle 124, floor mounting station 102, the first and second poles of station core 318 and first and second poles 314, 316 of vehicle core are in magnetic conjunction so that a substantially efficient transfer of electrical power can take place between floor mounting station 102 and vehicle 124.

Figure 28:
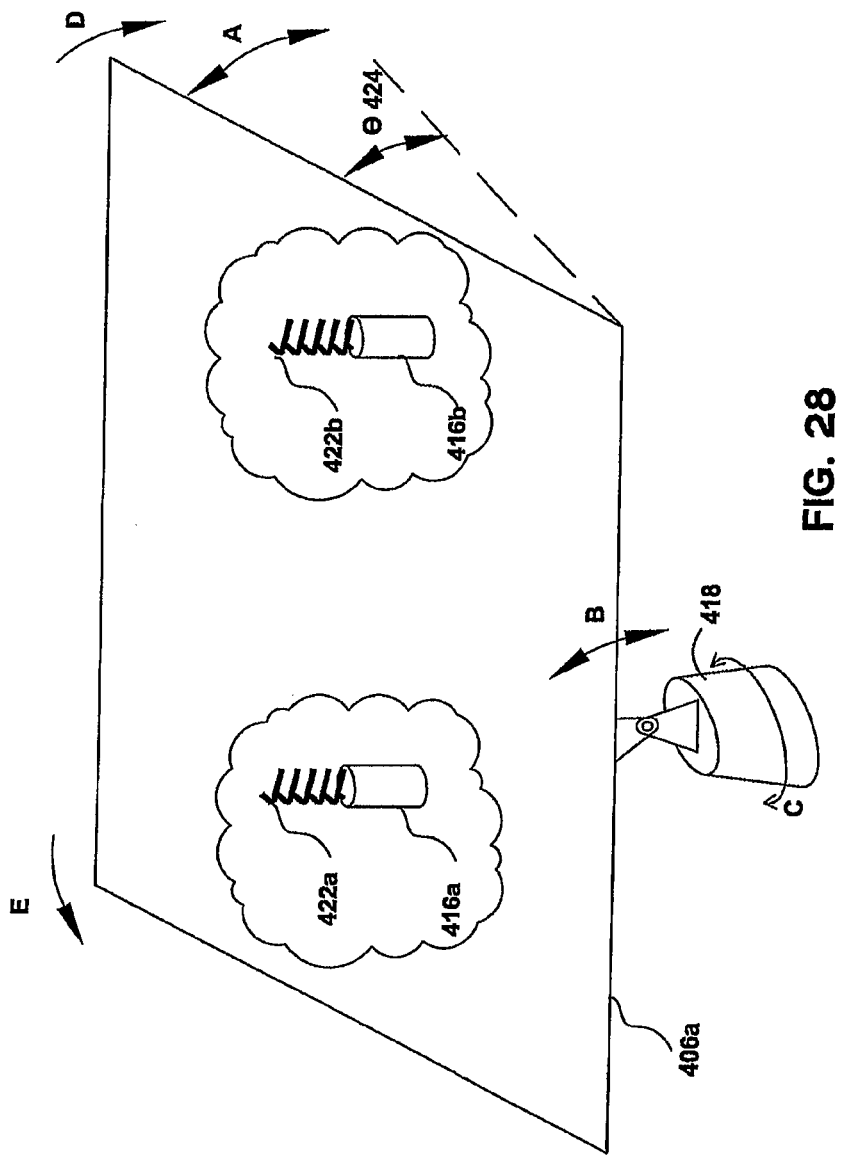
FIG. 28 is a partial cut-away side view of the floor mounting system of FIG. 24.

Referring now to FIGS. 26, 27, and 28, FIG. 26 is a front cut-away perspective view of floor mounting station 102 as shown in FIG. 24, FIG. 27 is a cut-away side view of floor mounting station 102, and FIG. 28 is a partial cut-away side view of floor mounting station 102. FIG. 26 illustrates a pair of front mounting receptacles 416a, 416b which provide a mounting location for springs 422a, 422b as shown in FIGS. 27 and 28 which are then attached on a lower surface of first interface plate 406a. For purposes of this discussion, reference shall be made to an upper and lower surface of first interface plate 406a where the upper surface is that surface located closest to vehicle 124 and the lower surface is that surface located closest to or within station unit enclosure 410. A top portion of first interface plate 406a is that portion of first interface plate 406a that is closest to tower 402 and a lower portion of first interface plate 406a is that portion of first interface plate 406a that is located farthest away from tower 402, and to which is attached rear mounting receptacle 418 as shown in FIGS. 27 and 28. It will be appreciated that while two mounting receptacles are shown, other configurations will work equally well.

In operation, station unit 102 allows the vehicle induction coil 301 to come in as close proximity as possible to station induction coil 303. To facilitate a sufficient proximity of vehicle induction coil 301 and station induction coil 303, station unit 102 is constructed such that first interface plate 406a retains station induction coil 303 at plate inclination angle θ. Preferably, the plate inclination angle θ is a relatively shallow or small angle such that a smooth almost frictionless interface exists between vehicle induction coil 301 and station induction coil 303. Use of springs 422a, 422b at first and second mounting receptacles 416a, 416b provide first interface plate 406a with the ability to rotate about rear mounting receptacle 418 in the direction of arrow A as shown in FIG. 27, such that as vehicle 124 and vehicle induction coil 301 encounter station unit 102 and station induction coil 303, first interface plate 406a gently rotates downwardly. Springs 422a, 422b push first interface plate 406a with station induction coil 301 gently upwardly, so that station induction coil 303 and vehicle induction coil 301 can make sufficient contact while substantially minimizing shock, vibration, and mechanical damage.

Also shown in FIG. 27 is an electronics enclosure 150 which houses station control unit 104 which is electrically connected to station induction coil 303. The electronics are electrically connected or wirelessly connected to indicators 140 and/or indicator panel 420. Station unit enclosure 410 is fixed to the floor or ground via floor mounting fixture 404 and bolt 432.

As discussed above, first interface plate 406a can rotate about rear mounting receptacle 418 in the direction of arrow A, because first interface plate 406a is mounted to rear mounting receptacle 418 via a pin that can rotate as shown by arrow B. Referring now to FIG. 28, it can be seen that rear mounting receptacle 418 can also rotate in the direction of arrow C which further allows rotation of first plate 406a in the direction of arrows D and E as shown in FIG. 28. Springs 422a, 422b allow the first plate 406a to rotate in the direction of arrows D and E, but such rotation would be constrained with the use of rotating rear mounting receptacle 418. According to an alternate embodiment, rear mounting receptacle 418 can be replaced with spring 422 and still operate in a substantially similar manner. Thus, the combination of rotating rear mounting receptacle 418 and front mounting receptacles 416a, 416b with springs 422 provides first interface plate 406a with the means to move in two dimensions: up and down as shown by arrow A in FIG. 27 and to the left and right as shown by arrows D and E, in FIG. 28 in order to self-align the station induction coil 303 on the first interface plate 406a with the vehicle induction coil 301.

Figure 29:
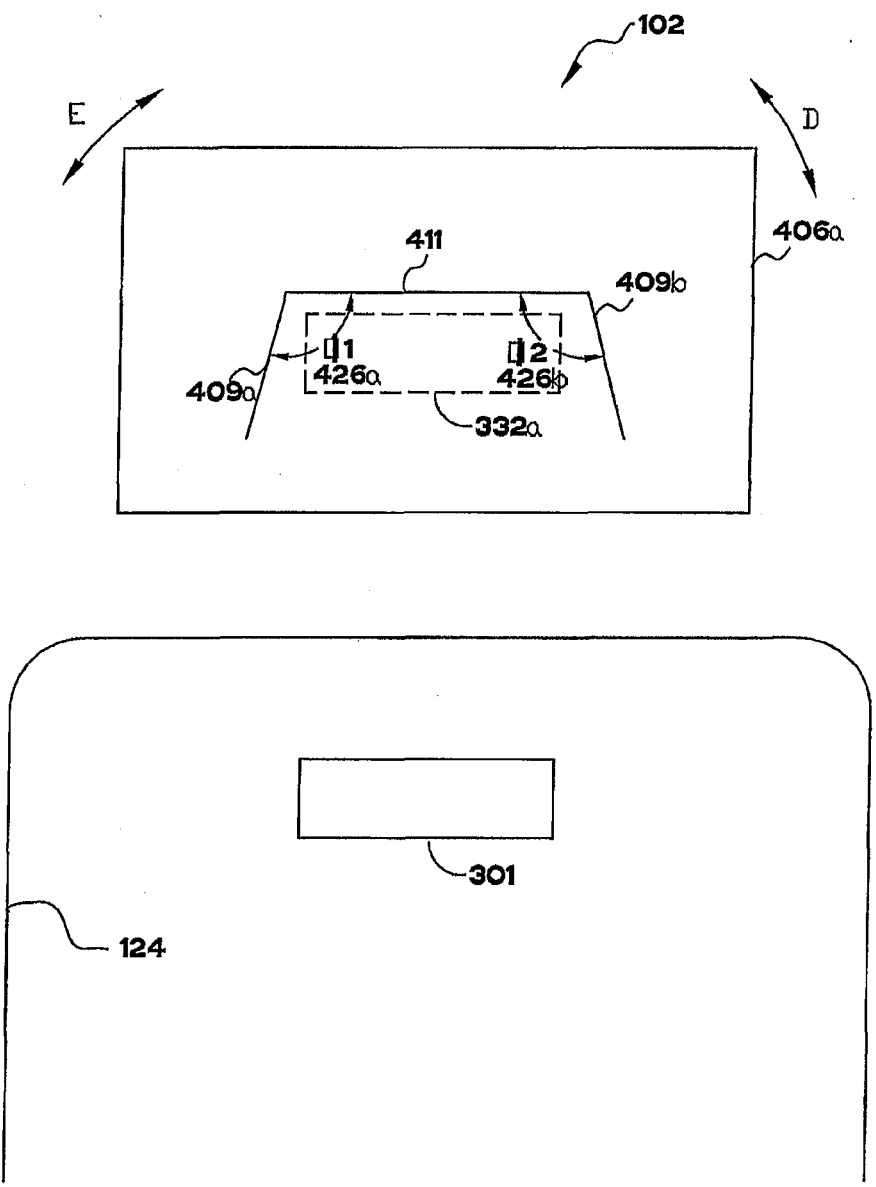
FIG. 29 is a partial top view of a vehicle approaching the floor mounting system of FIG. 24.
Figure 30A:
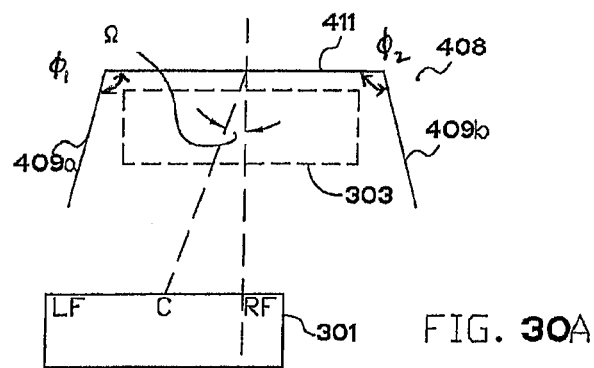
FIGS. 30A and 30B illustrate different angles of approach between a vehicle and the floor mounting system.
Figure 30B:
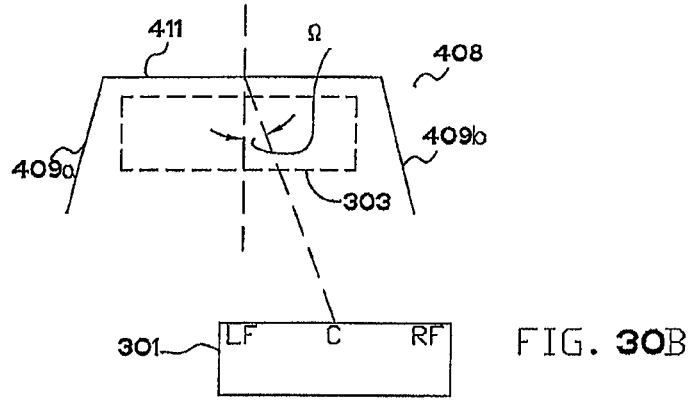

Attention is now directed to FIGS. 29 and 30. FIG. 29 is a partial top view of vehicle 124 approaching floor mounting station 102 as shown in FIG. 24, and FIGS. 30A and 30B illustrate angles of approach between vehicle 124 and floor mounting station 102 as shown in FIGS. 24 and 29. As discussed above, the combination of rotating rear mounting receptacle 418 and front mounting receptacles 416a, 416b with springs 422 provides first interface plate 406a with the means to move laterally and vertically in order to self-align first interface plate 406a and station induction coil 303 with vehicle induction coil 301. Self-alignment, however, is accomplished by interaction between vehicle induction coil 301 as it approaches station unit 102 and self-align first interface plate 406a so that vehicle induction coil 301 and station induction coil 303 are proximately close together. Plate guide 408 comprises left plate guide arm 409a, right plate guide arm 409b, and plate guide back wall 411. Both first and second plate guide arms 409a, 409b are formed at a plate guide angles $\Phi_{1,2}$ with respect to plate guide back wall 411. As discussed in greater detail below, the length of first and second plate guide arms 409a, 409b and plate guide angle $\Phi$ directly determine the limitations in terms of distances in which self-alignment can still occur.

Various design considerations are taken into account in the design of plate guide 408, the length of plate guide arms 409a, 409b, and the angles of left and right plate guide arms 409a, b. If plate guide angle Φ is too large and/or the length of plate guide arms 409a, 409b is too long, then there will not be enough range of motion in springs 422 and rear mounting receptacle 418. In other words, if plate guide angle Φ is too large, vehicle 124 can approach floor mounting station 102 at too large of an angle for first interface plate 406 to compensate for self-alignment, and it will not occur. Moreover, limiting plate guide angle Φ means that there is a limitation on the angle that vehicle 124 can make in approaching first interface plate 406, which is referred to as approach angle Ω. Approach angle Ω is shown in FIGS. 30A, and 30B.

Figure 31:
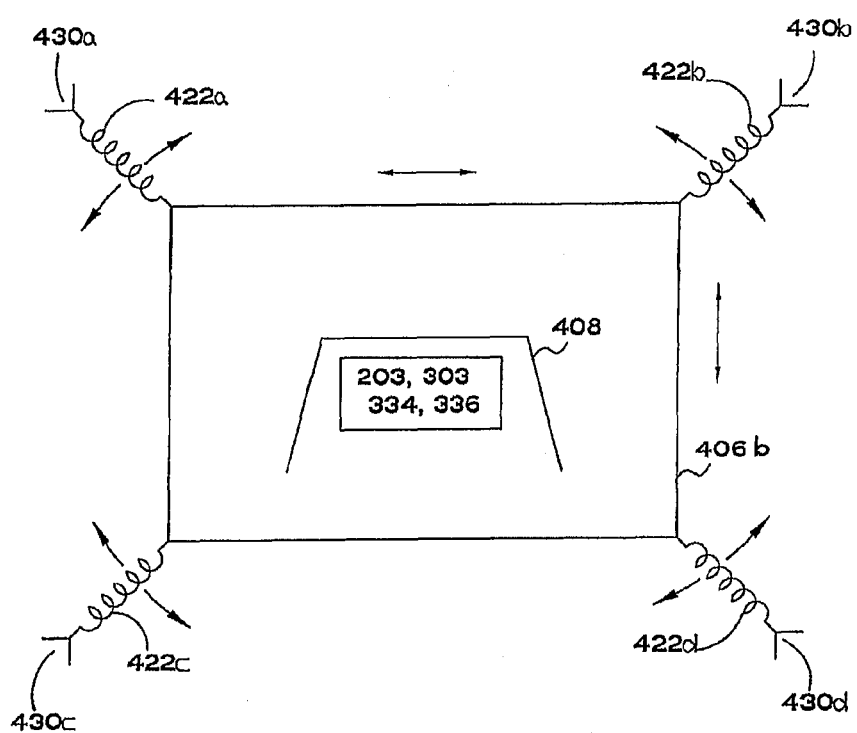
FIG. 31 is a partial top view of an alternate embodiment of a floor mounting system that can be used with a self-aligning inductive alternating current (AC) power transfer system.
Figure 32:
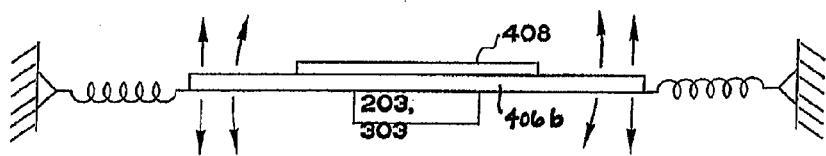
FIG. 32 is a side view of the floor mounting system of FIG. 31.

As seen in FIG. 30A (which shows only enough detail of floor mounting station 102 necessary for an explanation of approach angle Ω), if vehicle 124 is approaching such that it is to the left of station unit 102, the left-front corner LF of vehicle induction coil 301 will be aligned just to the right or inner part of the end-most portion of left plate guide arm 409a. If vehicle 124 was any further to the left of station unit 102, a front portion of vehicle induction coil 301 would impact left plate guide arm 409a, and no self-alignment could take place. A similar situation occurs when vehicle 124 approaches from the right side of station unit 102 wherein, as shown in FIG. 30B, the right-front corner RF of vehicle induction coil 301 will be aligned just to the left, or inner, part of the end-most portion of right plate guide arm 409b FIG. 31 is a partial top view of an alternate embodiment of the second interface plate 406b that is used with first and second power transfer system 200, 300 and FIG. 32 is a side view of second interface plate 406b. Second interface plate 406b operates in a manner similar to first interface plate 406a, and all other components of floor mounting station 102 not shown in FIGS. 31 and 32 are substantially the same as discussed above. Second interface plate 406b differs from first interface plate 406a in that it is connected to enclosure upper surface 412a, 412b and not to the inner floor surface of station unit enclosure 410 by several springs 422a-d and plate anchors 430a-d as shown in FIG. 31. The arrangement of plate anchors 430a-d and springs 422a-d and their connection to second interface plate 406b provides second interface plate 406b with the ability to move in three dimensions and to rotate as shown in FIGS. 31 and 32. However, even with additional degrees of movement, there are limitations on the angles of movement and the approach angle of vehicle 124 as discussed above with respect to the first interface plate 406a. That is, there is a plate guide angle, now referred to as second plate guide angle Φ, and there is an approach angle Ω, now referred to as second approach angle Ω.

Tower 401 contains indicators 140a-d and an indicator panel 420 that houses indicators 140a-d as shown in FIG. 27. Indicators 140a-d can be one or more of many different types of colored indicators such as light emitting diodes (LEDs), incandescent bulbs, florescent bulbs, neon lamps, plasma panels, light commanding diodes (LCDs), fiber optic cables, or even white/clear-colored indicators, with colored plastic or glass coverings.

By way of example, indicator 140a can be colored red and indicates "STOP", meaning that vehicle 124 is in position. Indicator 140b can be colored yellow to indicate "CHARGING", meaning self aligning power transfer system 100 is charging vehicle 124. Indicator 140c is colored green and indicates "READY", meaning floor mounting station 102 and vehicle unit 108 have communicated with each other and that self aligning power transfer system 100 is ready to begin charging. Indictor 104d can be colored blue to indicate "STOPPED CHARGING", meaning that charging is completed. Of course, the colors and messages/meanings can be altered and configured to fit specific situations, and/or design choices Not shown but part of station unit 108 is a proximity detector which can be a separate sensor or a particular function that is carried out by station communication module 134 and vehicle communication module 132. Proximity detection determines when vehicle 124 is in position and ready to accept electrical power. The proximity detector also determines when vehicle 124 has pulled away from or is no longer in close proximity to station unit 108 so that if charging is still occurring, controls can be implemented to turn off power to station induction coil 203, 303.

Communications between the vehicle 124 and the self-aligning power transfer system 100 can take the form of wireless communications such as via radio frequency (RF) or microwave frequencies (or higher), infra-red, laser, and ultrasonic signals or in a wired fashion by a physical connection between vehicle 124 and vehicle unit 108, and floor mounting station 102. Communications and other electrical specifications are discussed in greater detail in "Surface Vehicle Recommend Practice," published by The Engineering Society for Advancing Mobility Land Sea Air and Space, Society of Automotive Engineers (SAE), document J1772, issued in October of 1996, rev. November 2001 and the "2008 National Electrical Code Handbook," Article 625, "Electric Vehicle Charging System," both of which are incorporated herein by reference.

Figure 33:
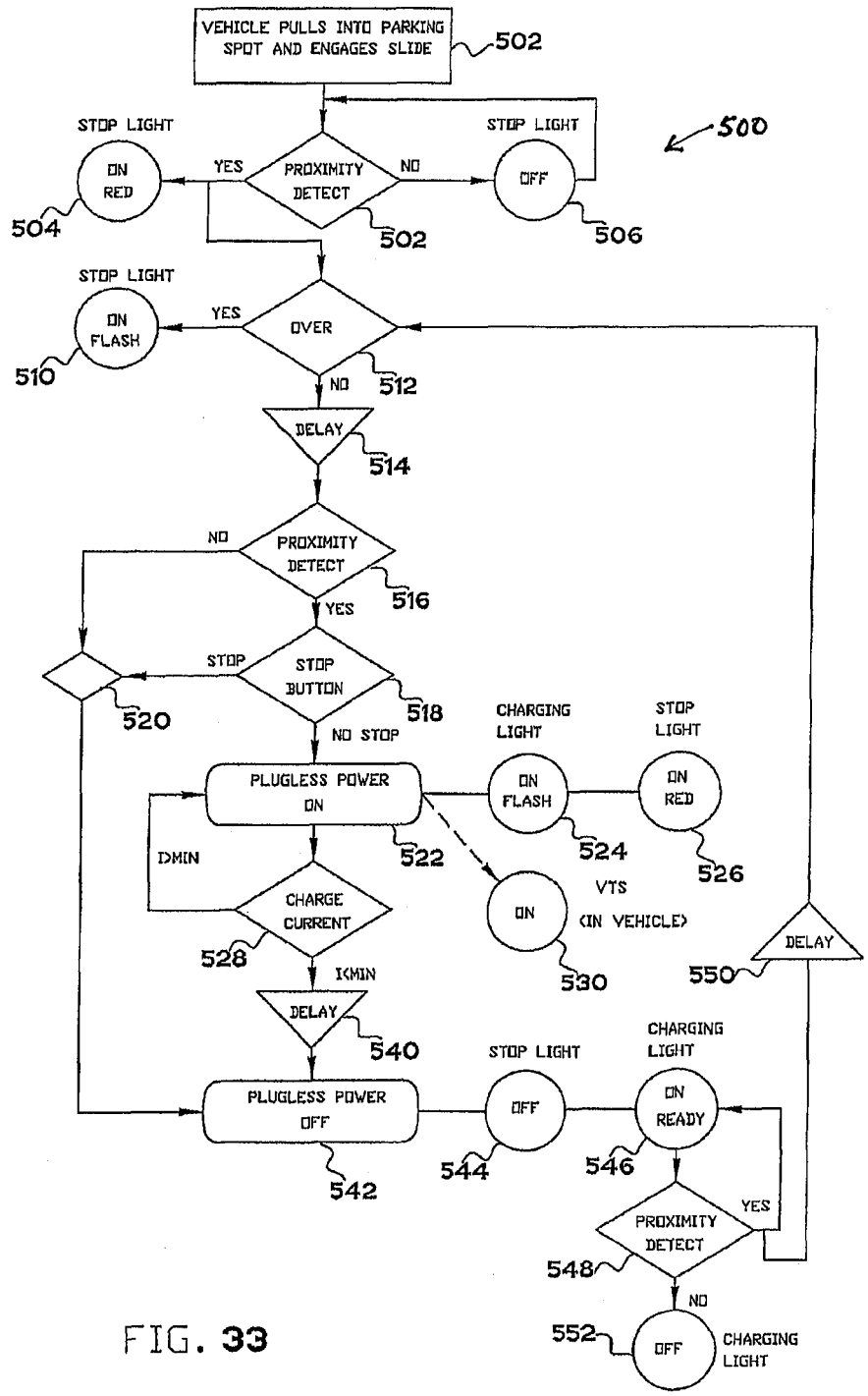
FIG. 33 is a flow diagram illustrating operation of a self-aligning inductive alternating current (AC) power transfer system.

FIG. 33 is a flow diagram of method 500 illustrating operation of the self-aligning inductive AC power transfer system 100 according to another embodiment. Method 500 begins when vehicle 124 pulls into a parking spot, and engages floor mounting station 102. In decision step 502, one or more sensors determine proximity of vehicle 124 and communicates that the vehicle 124 has properly mated with self-aligning power transfer system 100 ("Yes" path from decision step 502). Stop indicator 140a is lit (step 504). Alternatively, if vehicle 124 has not properly mated with self-aligning power transfer system 100, decision step 502 prevents stop indicator 140a from lighting (step 506, "No" path from decision step 502). Method 500 continues to check the proximity detector function, until proximity is detected. Following decision step 502, method 500 proceeds to decision step 512, and the balance of the flow chart.

Figure 7:
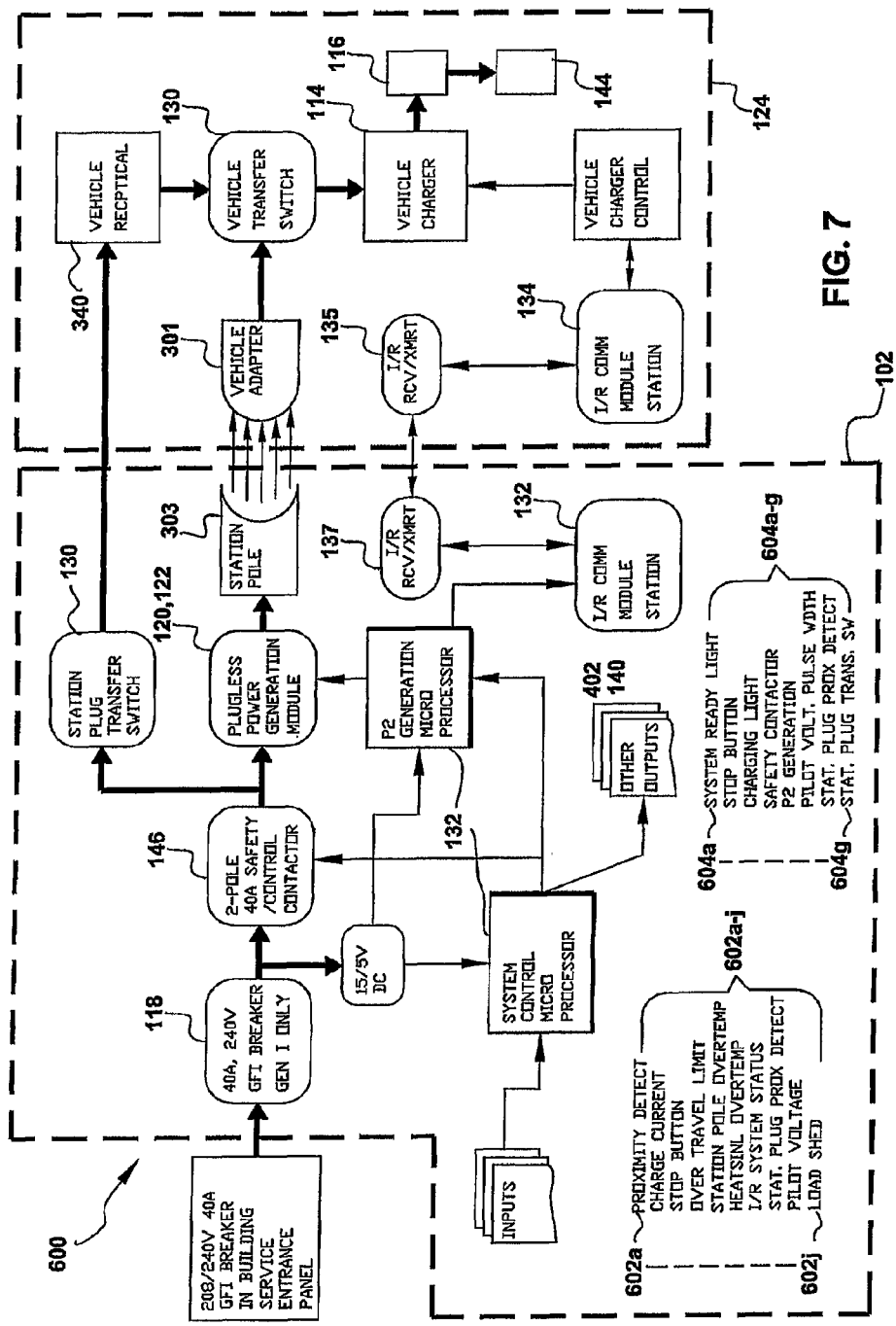
FIG. 7 is a block diagram of a self-aligning inductive AC power transfer system according to a further embodiment of the present invention.

FIG. 7 is a system architecture block diagram 600 for the self-aligning inductive AC power transfer system 100 according to a further embodiment. Substantially all of the components shown in FIG. 7 have been discussed in greater detail above, and therefore shall not be repeated again. However, there are some components of system architecture 600 that have not been addressed. For example, additional inputs 602a-j to station computer 132 can be incorporated into self-alignment power transfer system 100. A non-exhaustive list of additional inputs can further include proximity detect 602a (discussed above), charge current 602b, stop button 602c, over travel limit 602d, station pole over-temperature 602e, heat sink over-temperature 602f, infra-red system status 602g, station pole proximity detect 602h, pilot voltage 602i, and load shed 602j. Additional outputs can be produced by vehicle computer 134 for use by self-alignment system 100 and for observation by an operator of self-alignment power transfer system 100. These include, for example, system ready light 604a (discussed above), stop light 604b (discussed above), charging light 604c (discussed above), safety contactor 604d, P2 generation 604e, pilot voltage pulse width 604f, and station plug transfer switch 604g, among others.

Charge current 602*b* can be an input to station computer 132 to monitor and track the amount of current that is being transferred to vehicle 124. A separate charge current can also be monitored by vehicle computer 134 and the two values can be compared. Over travel limit 602*d* can be detected by station computer 132 to detect when vehicle 124 is misaligned with station unit 102. Station pole over-temperature 602*e* is an indication of the temperature of either one or both of first and second poles of primary and/or secondary cores 314, 316, 318, 320. Heat sink over-temperature 602*f* is an indication of the temperature of a heat sink for one or both of vehicle core 302 and station core 304, or of station unit 102 itself. Infra-red system status 602*g* is an induction of the operating status of vehicle and station communication devices 137, 136 respectively. Station pole proximity detect 602*h* is an indication of proximity between one or both first and second poles of secondary core 314, 316 with first and second poles of primary core 318, 320.

Additional outputs can be produced for observation by an operator of self-alignment power transfer system 100. These can include, for example, system ready light 604*a*, stop light 604*b*, and charging light 604*c*.

Figure 34:
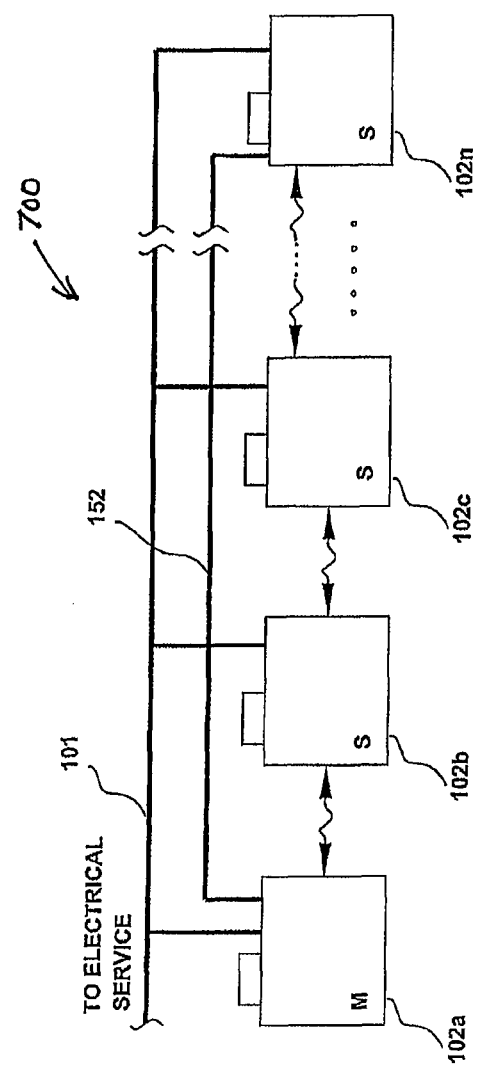
FIG. 34 is a block diagram of a multiple-user floor mounted station system according to the present invention.

FIG. 34 is a block diagram of a multiple-user floor mounted station system 700 according to an exemplary embodiment. Multiple floor mounted system 700 allows multiple users to charge their vehicles or other devices that use rechargeable batteries 116, simultaneously. Thus, for example, multiple floor mounted station system can be used at parking lots and garages, convenience stores, shopping centers, malls, and housing developments, among other places. Vendors can charge user fees for recharging vehicles and an appropriately designed user interface that takes different modes of payments (cash, credit cards, electronic tag systems) could be used to collect the user-charging fees.

Multiple floor mounted station system 700 can simultaneously charge one or more vehicles 124 at a time. The multiple charging system 700 operates similarly to a stand-alone charging system 102. As shown in FIG. 34, there are several floor mounted stations 102 interconnected by AC input power 101, and intra-floor mounted station communication cable 152. Each individual floor mounted station 102 operates similarly to that as described above, except that with two or more floor mounted stations 102 connected together in the configuration of multiple floor mounted station system 700 as shown in FIG. 34, one of the multiple stations 102 must be designated a master and the rest as slaves. The master floor mounted station 102 of multiple floor mounted station system 700 can communicate with its slaves either wirelessly or through a wired communication cable 152, as shown in FIG. 34 using RS232, USB, or other types of communication. Communication can be performed from the master to all slaves and visa-versa, or from the master to slave 1, then from slave 1 to slave 2, and so on. In either case, the master floor mounted station 102 must be informed of all of the slave floor mounted stations 102 that it is responsible for, and this can be done manually via switches or electronically. For example, there can be a protocol built into floor mounted station 102 that when communication cable 152 is hooked into a first station 102, it automatically begins searching for other stations 102 and attempts to determine which one is the master.

The master floor mounted station 102 of the multiple system 700 collects data for billing and/or maintenance purposes and can communicate with a base station by cellular, internet or other landline/wireless communication system. The master floor mounted station of the multiple station system 700 controls current load distribution between and among its slaves. By way of example, assume that there are 10 stations 102 in a multiple floor mounted station system 700, each providing a total of 50 Amps current for recharging. However, the electrical service that multiple station system is connected to is rated only for 400 Amps. If ten vehicles are simultaneously recharging, the maximum current load for the electrical circuit will be exceeded, and either the breaker will trip, or a catastrophic failure and fire could result. According to the invention, the master floor mounted station 102 can detect that the tenth vehicle is ready to begin charging and can communicate to its slaves to decrease their respective output charging current to 40 Amps (or less) until further notified. Information about each slave's charging current is automatically communicated to the master, or the master can periodically request status updates, or a combination thereof can occur. As soon as one of the slave's vehicle discontinues charging, the master station 102 authorizes maximum charging current from the balance of the slave stations. A preferential payment system can be implemented that allows a user to pay more for the express purpose of receiving a maximum charging current from its charging station 102 even if the charging current provided by other stations 102 are severely degraded.

There are several advantages to the design and implementation of self-alignment power transfer system 100 according to the various embodiments discussed herein. For example, it is advantageous to provide inductive power transfer to a vehicle that is universal in nature, and wherein the voltage ratio of the station and vehicle unit is matched to supply the proper charging voltage and power required by the vehicle.

A further advantage is to eliminate the problems associated with handling dirty, wet, dangerous frayed cords and exposed live contacts since there are no live contacts which the operator can access. The invention provides a very convenient method of inductive power transfer that requires that the operator need only to drive up to and over a self-aligning station unit to initiate power transfer. Coupling of the vehicle with the charging station is safe and tamper proof while power is transferred to the vehicle. The invention further provides high power, high efficiency, low audible noise power transfer to the vehicle that is durable, reliable and economical. This is accomplished by the use of a transformer gap composed of semi-permeable magnetic material.

While the preferred forms and embodiments of the present invention have been illustrated and described, it will be readily apparent to those skilled in the art that various changes and modifications may be made without deviating from the inventive concepts set forth above.

What is claimed is:

1. A system for charging a rechargeable battery, comprising:
    a power transformer including
        a first core, the first core including first, second, and third pole surface areas; and
        a second core, the second core including first, second, and third pole surface areas, and wherein
            the first core and the second core are separated by first, second, and third air gaps,
            the first air gap separating the first pole surface area of the first core and the first pole surface area of the second core, the second air gap separating the second pole surface area of the first core and the second pole surface area of the second core, and the third air gap separating the third pole surface area of the first core and the third pole surface area of the second core; and a semi-permeable magnetic membrane comprising an epoxy binder and a ferromagnetic material embedded within the epoxy binder, wherein
the semi-permeable magnetic membrane coats each of the first, second, and third poles on the first core, and
the semi-permeable magnetic membrane coats each of the first, second, and third poles on the second core,
the first core is electrically connected to a primary voltage source, and
the second core is located apart from the first core until recharging occurs and further is electrically connected to the rechargeable battery.

2. The system for recharging according to claim 1, wherein the ferromagnetic material includes at least one of iron and steel.

3. The system for recharging according to claim 1, wherein the semi-permeable magnetic material comprises a mixture of between 30% and 90% iron or steel filings in an epoxy binder.

4. An inductively coupled battery recharging system, comprising:
a first inductive winding coupled to an exterior power source and including
a first core,
a first winding area of the first core including a first winding cross sectional area;
a first pole section of the first core including a first pole sectional area, a second pole section of the first core including a second pole sectional area, and a third pole section of the first core including a third pole section area, wherein the first core first, second and third surface areas are substantially similar in shape and size; and
a second inductive winding coupled to a rechargeable battery and including
a second core,
a second winding area of the second core including a second winding cross sectional area;
a first pole section of the second core including a first pole sectional area, and a second pole section of the second core includes a second pole sectional area, and a third pole section of the second core including a third pole sectional area, wherein the second core first, second, and third pole sectional areas are substantially similar in shape and size, the first and second core winding sectional areas are substantially similar in shape and size, and the first, second, and third pole sectional areas of the first and second cores are substantially similar in shape and size, respectively, and further wherein,
the ratio of the area of the pole of the core to the area of the winding of the core is between 2.0 and 5.0, whereby a first magnetic flux area formed between the first pole of the first core and the first pole of the second core, and a second magnetic flux area formed between the second pole of the first core and the second pole of the second core, and a third magnetic flux area formed between the third pole of the first core and the third pole of the second core are substantially contained, respectively, within a first volume formed by the cross sectional areas of the first pole of the first core and the first pole of the second core, the second pole of the first core and the second pole of the second core, and the third pole of the first core and the third pole of the second core.

5. An inductively coupled battery recharging system as defined in claim 4, wherein the ratio of the area of the pole of the core to the area of the winding of the core is about 3.2.

6. An inductively coupled battery recharging system as defined in claim 4, and further comprising a semi-permeable magnetic material comprising an epoxy binder and a ferromagnetic material embedded within the epoxy binder for coating said first and second poles on said first and second cores, respectively.

7. An inductively coupled battery recharging system as defined in claim 6, wherein the ferromagnetic material includes at least one of iron and steel.

8. An inductively coupled battery recharging system as defined in claim 6, wherein the semi-permeable magnetic material comprises a mixture of between 30% and 90% of at least one of iron and steel filings in an epoxy binder.

9. Apparatus for inductively charging a battery in a vehicle, comprising
(a) a fixture;
(b) an interface plate connected with said fixture and movable with respect thereto;
(c) a transformer including
(1) a primary coil mounted on said interface plate; and
(2) a secondary coil mounted on the vehicle, whereby when the vehicle is positioned adjacent to said fixture and said secondary coil is opposite said primary coil and power is supplied to said primary coil, inductive power is transmitted to said secondary coil to charge the vehicle battery.

10. Apparatus as defined in claim 9, and further comprising means for displacing said interface plate to position said primary coil proximate to said secondary coil.

11. Apparatus as defined in claim 10, wherein said displacing means comprises a guide plate mounted on said interface plate, said guide plate engaging a member on said vehicle and being displaced relative to said vehicle member to displace said interface plate laterally and longitudinally relative to the vehicle to align said primary and secondary coils.

12. Apparatus as defined in claim 11, wherein said interface plate is pivotally connected with said fixture.

13. Apparatus as defined in claim 12, wherein said displacing means further comprises a spring for pivoting said interface plate vertically to position said primary coil proximate to said secondary coil.

14. Apparatus as defined in claim 10, and further comprising a first control module connected with said fixture and a second control module connected with said second coil said first control module controlling the operation of said first coil and said second control module controlling the operation of said second coil.

15. Apparatus as defined in claim 14, and wherein said first and second control modules include wireless communication devices for sending information between said first and second control modules.

16. Apparatus as defined in claim 15, wherein said first control module is connected with said displacing means to control the movement of said interface plate.

17. Apparatus as defined in claim 16, wherein said displacing means moves said interface plate laterally, longitudinally and vertically to position said first coil proximate to said second coil.

18. Apparatus as defined in claim 17, wherein said communication devices transmit information between said first and second modules relating to the strength of the magnetic field generated by said coils in order to position said interface plate in a position where energy transferred from said first coil to said second coil is maximized.

* * * * *